(12) United States Patent
Tu et al.

(10) Patent No.: US 10,085,027 B2
(45) Date of Patent: Sep. 25, 2018

(54) ADAPTIVE MODE CHECKING ORDER FOR VIDEO ENCODING

(71) Applicant: QUALCOMM Incorporated, San Diego, CA (US)

(72) Inventors: Chengjie Tu, San Diego, CA (US); Wei-Jung Chien, San Diego, CA (US); Xianglin Wang, San Diego, CA (US); Jaehong Chon, San Diego, CA (US); In Suk Chong, San Diego, CA (US); Marta Karczewicz, San Diego, CA (US); Woo-Shik Kim, San Diego, CA (US); Xin Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 14/737,252

(22) Filed: Jun. 11, 2015

(65) Prior Publication Data

US 2016/0261861 A1 Sep. 8, 2016

Related U.S. Application Data

(60) Provisional application No. 62/129,545, filed on Mar. 6, 2015.

(51) Int. Cl.
*H04N 11/02* (2006.01)
*H04N 19/14* (2014.01)
(Continued)

(52) U.S. Cl.
CPC ........... *H04N 19/14* (2014.11); *H04N 19/109* (2014.11); *H04N 19/119* (2014.11);
(Continued)

(58) Field of Classification Search
CPC ...................................................... H04N 19/14
(Continued)

(56) References Cited

U.S. PATENT DOCUMENTS 8,155,191 B2     4/2012  Lu et al.
8,619,859 B2 *  12/2013  Lee ........................ H04N 19/56
                                                              375/240

(Continued)

FOREIGN PATENT DOCUMENTS

EP     2343899 A1    7/2011
GB     2499874 A     9/2013
(Continued)

OTHER PUBLICATIONS

Second Written Opinion for International Application No. PCT/US2016/020736, dated Feb. 9, 2017, 8 pp.
(Continued)

*Primary Examiner* — Leron Beck
(74) *Attorney, Agent, or Firm* — Shumaker & Sieffert, P.A.

(57) ABSTRACT

A video encoding device comprises a memory configured and at least one processor configured to: determine whether a metric meets a condition based on statistics, wherein the statistics are associated with a first video encoding mode checking order and a second video encoding mode checking order, responsive to determining that the metric meets the condition, select a first encoding mode checking order to encode the first block of video data responsive to determining that the condition is not met, select a second encoding mode checking order different from the first encoding mode checking order to encode the first block of video data, update the statistics based on the selected first or second encoding
(Continued)

mode checking order, and encode a second block of video data, based on the updated statistics, and using the first or second mode checking order.

32 Claims, 26 Drawing Sheets

(51) Int. Cl.
*H04N 19/147* (2014.01)
*H04N 19/176* (2014.01)
*H04N 19/119* (2014.01)
*H04N 19/109* (2014.01)
*H04N 19/157* (2014.01)
*H04N 19/567* (2014.01)
*H04N 19/174* (2014.01)

(52) U.S. Cl.
CPC ......... *H04N 19/147* (2014.11); *H04N 19/157* (2014.11); *H04N 19/176* (2014.11); *H04N 19/174* (2014.11); *H04N 19/567* (2014.11)

(58) Field of Classification Search
USPC ...................................... 375/240.01–240.29
See application file for complete search history.

(56) References Cited

U.S. PATENT DOCUMENTS

| | | | |
|---|---|---|---|
| 9,319,704 | B2 | 4/2016 | Han et al. |
| 2005/0135484 | A1* | 6/2005 | Lee ............... H04N 19/176 375/240.16 |
| 2006/0062302 | A1 | 3/2006 | Yin et al. |
| 2006/0133511 | A1* | 6/2006 | Chen ............... H04N 19/197 375/240.24 |
| 2006/0193385 | A1* | 8/2006 | Yin ............... H04N 19/197 375/240.12 |
| 2007/0133690 | A1 | 6/2007 | Xin et al. |
| 2008/0112481 | A1* | 5/2008 | Hsaing ............... H04N 19/50 375/240.03 |
| 2008/0152000 | A1 | 6/2008 | Kaushik |
| 2009/0016443 | A1* | 1/2009 | Kim ............... H04N 19/176 375/240.24 |
| 2009/0110066 | A1 | 4/2009 | Wang et al. |
| 2010/0118959 | A1* | 5/2010 | Lou ............... H04N 19/197 375/240.16 |
| 2011/0206123 | A1* | 8/2011 | Panchal ............ H04N 19/70 375/240.15 |
| 2011/0243229 | A1* | 10/2011 | Kim ............... H04N 19/176 375/240.13 |
| 2011/0261876 | A1* | 10/2011 | Tan ............... H04N 19/52 375/240.01 |
| 2012/0195364 | A1 | 8/2012 | Yi et al. |
| 2012/0320969 | A1 | 12/2012 | Zheng et al. |
| 2013/0195190 | A1 | 8/2013 | Lee et al. |
| 2013/0202025 | A1* | 8/2013 | Baron ............... H04N 19/00139 375/240.02 |
| 2013/0208799 | A1* | 8/2013 | Srinivasamurthy .. H04N 19/119 375/240.16 |
| 2013/0229485 | A1* | 9/2013 | Rusanovskyy .... H04N 13/0048 348/43 |
| 2014/0146884 | A1 | 5/2014 | Cho et al. |
| 2014/0241436 | A1* | 8/2014 | Laroche ........... H04N 19/00684 375/240.16 |
| 2014/0307787 | A1 | 10/2014 | Zheng et al. |
| 2015/0022633 | A1 | 1/2015 | Zhang et al. |
| 2015/0103910 | A1 | 4/2015 | Kwon et al. |
| 2015/0189269 | A1* | 7/2015 | Han ............... H04N 19/176 375/240.12 |
| 2015/0271510 | A1 | 9/2015 | Wen et al. |
| 2016/0073133 | A1* | 3/2016 | Lee ............... H04N 19/52 375/240.12 |
| 2016/0261870 | A1 | 9/2016 | Tu et al. |

FOREIGN PATENT DOCUMENTS

| | | |
|---|---|---|
| GB | 2506590 A | 4/2014 |
| JP | 2006513636 A | 4/2006 |
| JP | 2007166608 A | 6/2007 |
| JP | 2008519503 A | 6/2008 |
| JP | 2008283402 A | 11/2008 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603_d4, 5th Meeting: Geneva, CH, Mar. 16-23, 2011,(Joint Collaborative Team on Video Coding of ISO/IEC JTC1/SC29/WG11 and ITU-T SG.16); May 9, 2011, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Choi, et al., "Fast Coding Mode Selection With Rate Distortion Optimization for MPEG-4 Part-10 AVC/H.264", IEEE Transactions

(56) References Cited

OTHER PUBLICATIONS on Circuits and Systems for Video Technology, IEEE Service Center, Piscataway, NJ, US, vol. 16, No. 12, Dec. 2006, XP011151047, pp. 1557-1561.
Correa, et al., "Complexity Control of High Efficiency Video Encoders for Power-constrained Devices," IEEE Transactions on Consumer Electronics, IEEE Service Center, New York, NY, US, vol. 57, No. 4, Nov. 2011; pp. 1866-1874, XP011398470.
Hassan, et al., "A Fast Coding Algorithm based on Fast Mode Decision for HEVC Standard," 14th International Conference on Sciences and Techniques of Automatic Control & Computer Engineering—STA'2013, IEEE, Dec. 20, 2013, pp. 158-163, XP032584330, DOI: 10.1109/STA.2013.6783123 [retrieved on Mar. 4, 2014].
Huang, et al., "Fast Intraframe Coding for High Efficiency Video Coding," KSII Transactions on Internet and Information Systems (TIIS), Mar. 2014, vol. 8 (3), pp. 1093-1104.
Qiu, et al., "A Fast Coding Unit Selection Algorithm for HEVC," 2013 IEEE International Conference on Multimedia and Expo Workshops (ICMEW), IEEE, Jul. 15, 2013, pp. 1-5, XP032494495.
Qiuping, et al., "A New Inter Prediction Mode Decision Method based on Temporal Correlation for HEVC Encoder," 2014 IEEE Workshop on Advanced Research and Technology in Industry Applications (WARTIA), IEEE, Sep. 29, 2014, pp. 1375-1378, XP032697607.
Tian, et al., "Content Adaptive Prediction Unit Size Decision Algorithm for HEVC Intra Coding," 2012 Picture Coding Symposium (PCS 2012) : Krakow, Poland, May 7-9, 2012 ; [Proceedings], IEEE, Piscataway, NJ, May 7, 2012, pp. 405-408, XP032449859.
Liu, et al., "A Texture Complexity Based Fast Prediction Unit Size Selection Algorithm for HEVC Intra-coding," 2014 IEEE 17th International Conference on Computational Science and Engineering, IEEE, Dec. 19, 2014 , pp. 1585-1588, XP032730106.
Yu, et al., "Image Texture Based Fast CU Size Selection Algorithm for HEVC Intra Coding," 2014 IEEE International Conference on Signal Processing, Communications and Computing (ICSPCC), IEEE, Aug. 5, 2014, pp. 363-367, XP032708886.
Zhao, et al., "Fast Mode Decision Based on Mode Adaptation," IEEE Transactions on Circuits and Systems for Video Technology, May 2010, vol. 20 (5), pp. 697-705.
U.S. Appl. No. 14/737,271, filed by Chengjie Tu et al. on Jun. 11, 2015.
International Search Report and Written Opinion from International Application No. PCT/US2016/020736, dated May 3, 2016, 14 pp.
Response to Written Opinion dated May 3, 2016, from International Application No. PCT/US2016/020736, filed on Jul. 12, 2016, 4 pp.
International Preliminary Report on Patentability—PCT/US2016/020736—ISA/EPO—dated May 9, 2015, 9 pp.
Second Written Opinion for International Application No. PCT/US2016/020684, dated Feb. 14, 2017, 9 pp.
International Search Report and Written Opinion from International Application No. PCT/2016/020684, dated Apr. 29, 2016, 13 pp.
Hou J., et al., "Fast CU Size Decision Based on Texture Complexity for HEVC Intra Coding," 2013 International Conference on Mechatronic Sciences, Electric Engineering and Computer (MEC), IEEE, Jan. 2, 2013, pp. 1096-1099.
Lee J., et al., "A Fast CU Size Decision Algorithm for HEVC", IEEE Transactions on Circuits and Systems for Video Technology, IEEE, Mar. 1, 2015, vol. 25, No. 3, pp. 411-421.
Nishikori T., et al., "A Fast CU Decision Using Image Variance in HEVC Intra Coding", IEEE Symposium on Industrial Electronics & Applications (ISIEA2013), IEEE, Sep. 2013, pp. 52-56.

* cited by examiner

240A

| -2 | 4 | -7 | 3 | 6 | -5 | 1 | -7 |
|---|---|---|---|---|---|---|---|
| 5 | 7 | -2 | 6 | 6 | -4 | -2 | -4 |
| 4 | 1 | -4 | -5 | 0 | -5 | -7 | -2 |
| 3 | -7 | -6 | -5 | 1 | 0 | 0 | -7 |
| 4 | 5 | -6 | -1 | 4 | -4 | -4 | 1 |
| -32 | 16 | -12 | -24 | -8 | -4 | 8 | -32 |
| -24 | 12 | -16 | -20 | 4 | 8 | 8 | -16 |
| 16 | -24 | -8 | -12 | -20 | -16 | -28 | 20 |

| -2 | 4 | -7 | 3 | 6 | -20 | 4 | -28 |
|---|---|---|---|---|---|---|---|
| 5 | 7 | -2 | 6 | 6 | -16 | -8 | -16 |
| 4 | 1 | -4 | -5 | 0 | -20 | -28 | -8 |
| 3 | -7 | -6 | -5 | 1 | 0 | 0 | -28 |
| 4 | 5 | -6 | -1 | 4 | -16 | -16 | 4 |
| -8 | 4 | -3 | -6 | -2 | -4 | 8 | -32 |
| -6 | 3 | -4 | -5 | 1 | 8 | 8 | -16 |
| 4 | -6 | -2 | -3 | -5 | -16 | -28 | 20 |

FIG. 13B

|     |     |     |     |     |     |     |     |
|----|----|----|----|----|----|----|----|
| -2 | 4  | -7 | 3  | 6  | -5 | 1  | -7 |
| 5  | 7  | -2 | 6  | 6  | -4 | -2 | -4 |
| 4  | 1  | -4 | -5 | 0  | -5 | -7 | -2 |
| 3  | -7 | -6 | -5 | 1  | 0  | 0  | -7 |
| 4  | 5  | -6 | -1 | 4  | -4 | -4 | 1  |
| -8 | 4  | -3 | -6 | -2 | -1 | 2  | -8 |
| -6 | 3  | -4 | -5 | 1  | 2  | 2  | -4 |
| 4  | -6 | -2 | -3 | -5 | -4 | -7 | 5  |

|     |     |     |     |     |     |     |     |
|----|----|----|----|----|----|----|----|
| -2 | 4  | -7 | 3  | 6  | -5 | 1  | -7 |
| 5  | 7  | -2 | 6  | 6  | -4 | -2 | -4 |
| 4  | 1  | -4 | -5 | 0  | -5 | -7 | -2 |
| 3  | -7 | -6 | -5 | 1  | 0  | 0  | -7 |
| 4  | 5  | -6 | -1 | 4  | -4 | -4 | 1  |
| -8 | 4  | -3 | -6 | -2 | -20 | 32 | -8 |
| -6 | 3  | -4 | -5 | 1  | 2  | 25 | -4 |
| 4  | -6 | -2 | -3 | -5 | -4 | -22 | -34 |

ADAPTIVE MODE CHECKING ORDER FOR VIDEO ENCODING

This application claims priority to U.S. Patent Application No. 62/129,545 filed Mar. 6, 2015, the entire content of which is hereby incorporated by reference.

TECHNICAL FIELD

This disclosure relates to video encoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, such as scalable video coding (SVC), multiview video coding (MVC), scalable HEVC (SHVC), multiview HEVC (MV-HEVC), 3D-HEVC, and the HEVC Range Extensions. The HEVC standard is also referred to "ITU-T Recommendation H.265." The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding tree units (CTUs), coding units (CUs) and/or coding nodes. Video blocks may include luma blocks and chroma blocks. In an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients may be entropy coded to achieve even more compression.

SUMMARY

The techniques of this disclosure are generally related to encoding video data. A video encoder encodes pictures (also referred to as frames) during video encoding. The video encoder partitions the picture into blocks of video data. The video encoder may determine the size of the block partitioning, as well as the number of times any partitions should be further partitioned. The way a block is partitioned is referred to as a partitioning scheme. A video encoder may generally partition a block based on a rate-distortion (RD) cost associated with each partitioning scheme such that the selected partitioning scheme produces a desired RD cost. The techniques of this disclosure are generally related to enabling a video encoder to determine whether to use a fast RD check or a full RD check to determine a partitioning scheme for a block of video data.

A video encoder also selects a prediction mode for a block of video data. For example, a block may be intra-predicted or inter-predicted. In general, a video encoder uses a mode checking order to determine to check candidate prediction modes for blocks. The video coder may determine which video coding mode to use to predict a block based on RD costs associated with the candidate prediction modes. The techniques of this disclosure may enable a video coder to select a prediction mode for a block of video data using an adaptive mode checking order.

In one example of this disclosure, a method of encoding video data comprises: determining whether a metric meets a condition based on statistics, wherein the statistics are associated with a first video encoding mode checking order and a second video encoding mode checking order, responsive to determining that the metric meets the condition, selecting a first encoding mode checking order to encode the first block of video data, responsive to determining that the condition is not met, selecting a second encoding mode checking order different from the first encoding mode checking order to encode the first block of video data, updating the statistics based on the selected first or second encoding mode checking order, encoding a second block of video data, based on the updated statistics, and using the first or second encoding mode checking order.

In another example, a video encoding device comprises a memory configured to store video data and at least one processor configured to: determine whether a metric meets a condition based on statistics, wherein the statistics are associated with a first video encoding mode checking order and a second video encoding mode checking order, responsive to determining that the metric meets the condition, select a first encoding mode checking order to encode the first block of video data, responsive to determining that the condition is not met, select a second encoding mode checking order different from the first encoding mode checking order to encode the first block of video data, update the statistics based on the selected first or second encoding mode checking order, and encode a second block of video data, based on the updated statistics, and using the first or second mode checking order.

In another example, an apparatus comprising means for encoding video data further comprises: means for determining whether a metric meets a condition based on statistics, wherein the statistics are associated with a first video encoding mode checking order and a second video encoding mode checking order, means for selecting a first encoding mode checking order to encode the first block of video data responsive to determining that the metric meets the condition, means for selecting a second encoding mode checking order different from the first encoding mode checking order to encode the first block of video data responsive to determining that the condition is not met, means for updating the statistics based on the selected first or second encoding mode checking order; and means for encoding a second block of video data, based on the updated statistics, and using the first or second encoding mode checking order.

In another example, a non-transitory computer-readable storage medium includes instructions stored thereon that, when executed, cause at least one processor of a video encoding device to: determine whether a metric meets a condition based on statistics, wherein the statistics are associated with a first video encoding mode checking order and a second video encoding mode checking order different from the first encoding mode checking order, responsive to determining that the metric meets the condition, select a first encoding mode checking order to encode the first block of video data, responsive to determining that the condition is not met, select a second encoding mode checking order different from the first encoding mode checking order to encode the first block of video data, update the statistics based on the selected first or second encoding mode checking order, and encode a second block of video data, based on the updated statistics, and using the first or second encoding mode checking order.

The details of one or more examples are set forth in the accompanying drawings and the description below. Other features, objects, and advantages will be apparent from the description and drawings, and from the claims.

BRIEF DESCRIPTION OF DRAWINGS

FIGS. 13A and 13B are conceptual diagrams illustrating error distributions for corresponding 8×8 CUs that a video encoder may use to adaptively determine a PU partitioning scheme, in accordance with one or more aspects of this disclosure.

FIGS. 15A and 15B are conceptual diagrams illustrating error distributions for corresponding 8×8 CUs that a video encoder may use to adaptively determine a TU partitioning scheme, in accordance with one or more aspects of this disclosure.

DETAILED DESCRIPTION

In general, the techniques of this disclosure relate to techniques for enabling a video encoder to make decisions related to video coding modes and partition sizes for blocks of video data. Various examples described herein may enable a video coder to more quickly determine a prediction mode for a block based on statistics that the video coder determined for the block. Examples described herein also may enable a video encoder to more quickly determine a partitioning scheme for a block of video data. The determination of the partitioning may be based on statistics, such as rate-distortion associated with candidate prediction modes.

Figure 1:
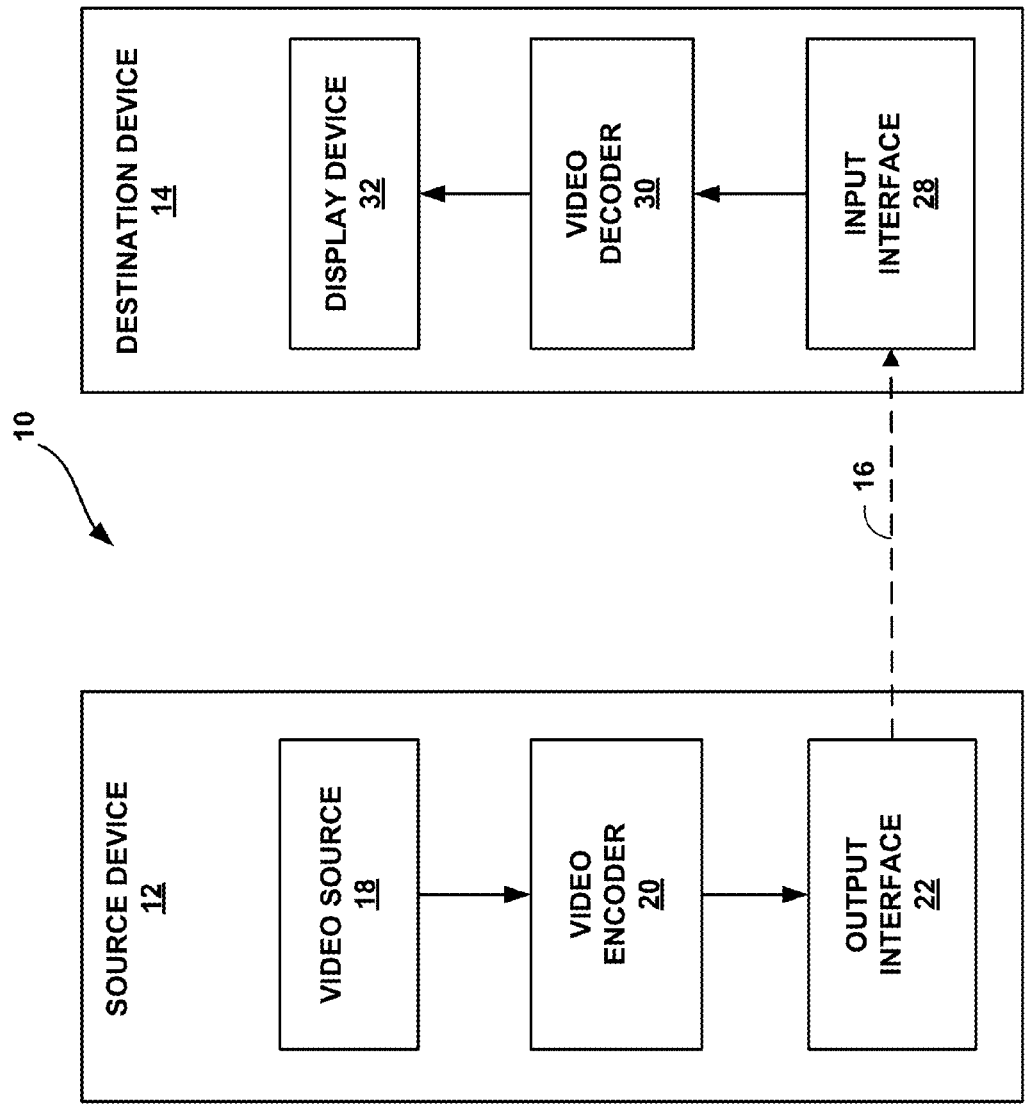
FIG. 1 is a block diagram illustrating an example video encoding and decoding system that may perform techniques for adaptive inter-color component residual prediction in accordance with one or more aspects of this disclosure.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory. Video encoder 20 and video decoder 30 may comprise memories configured to store video data. Video encoder 20 may encode the video data stored in the memory. Video decoder 30 may decode encoded video data and store the resulting video data in the memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternatively, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as the HEVC standard mentioned above, and described in HEVC Version 1, which is described in document ITU-T H.265, SERIES H: AUDIOVISUAL AND MULTIMEDIA SYSTEMS, Infrastructure of Audiovisual Services—Coding of Moving Video, "High Efficiency Video Coding," October 2014. In addition to HEVC Version 1, there are ongoing efforts to produce scalable video coding, multiview video coding, range extensions, screen content coding (SCC), and 3D coding extensions for HEVC.

In HEVC and other video coding standards, a video sequence typically includes a series of pictures. Pictures may also be referred to as "frames." A picture may include three component sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. This color space may be referred to as "YUV" or "YCbCr". In other instances, a picture may be monochrome and may only include an array of luma samples. According to the HEVC range extensions, pictures may comprise color spaces and chroma subsamplings, such as YCgCo, YCgCo-R, and combinations thereof.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate a residual block of the CU. Each sample in a residual block of the CU indicates a difference between a sample in a predictive block for a PU of the CU and a corresponding sample in a coding block of the CU. For example, video encoder 20 may generate a luma residual block of the CU. Each sample in the luma residual block of the CU indicates a difference between a luma sample in a predictive luma block of a PU of the CU and a corresponding sample in the luma coding block of the CU. In addition, video encoder 20 may generate a Cb residual block of the CU. Each sample in the Cb residual block of the CU may indicate a difference between a Cb sample in a predictive Cb block of a PU of the CU and a corresponding sample in the Cb coding block of the CU. Video encoder 20 may also generate a Cr residual block of the CU. Each sample in the Cr residual block of the CU may indicate a difference between a Cr sample in a predictive Cr block for a PU of the CU and a corresponding sample in the Cr coding block of the CU.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block.

Video encoder 20 may apply one or more transforms to a transform block for a TU to generate a coefficient block for the TU. For example, video encoder 20 may apply one or more transforms to a luma transform block for a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. A coefficient block may be a two-dimensional array of transform coefficients. A transform coefficient may be a scalar quantity. This disclosure uses the term "block" throughout. As defined herein, a block may refer to a CTU, CU, PU, TU or a group of samples of a component, e.g. a group of luma or chroma samples.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may comprise an encoded representation of video data.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units.

In the example of FIG. 1, video decoder 30 receives a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use intra prediction or inter prediction to determine predictive blocks of the PUs of a current CU. In addition, video decoder 30 may inverse quantize coefficient blocks for TUs of the current CU. Video decoder 30 may perform inverse transforms on the coefficient blocks to reconstruct transform blocks for the TUs of the current CU.

Video decoder 30 may reconstruct the coding blocks of the current CU by adding the samples of the predictive blocks for PUs of the current CU to corresponding samples of the transform blocks for the TUs of the current CU. By reconstructing the coding blocks for each CU of a picture, video decoder 30 may reconstruct the picture.

Figure 2:
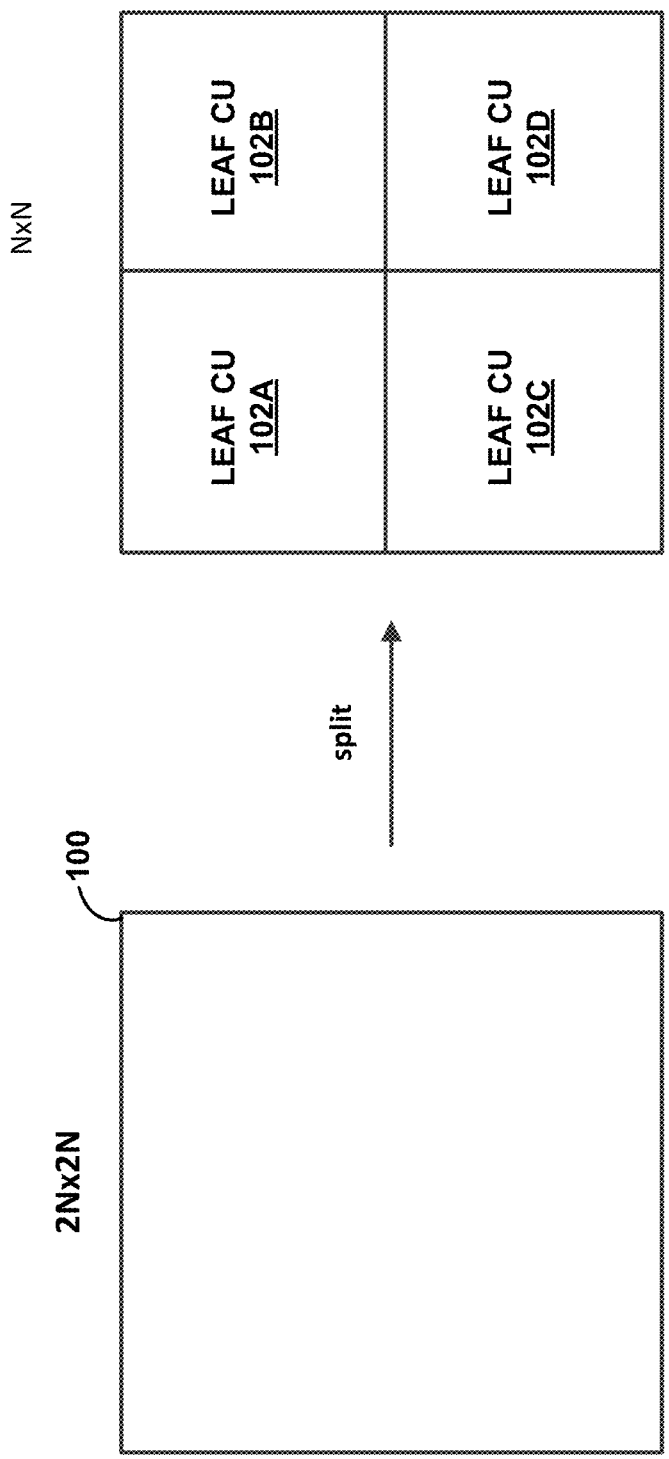
FIG. 2 is a conceptual diagram illustrating a CU that is partitioned into leaf CUs

As described above, according to various aspects of the HEVC specification, video encoder 20 may split a picture (also referred to as a "frame" at various instances herein) into CTUs. A particular CTU represents the root of a quad tree data structure made up of CUs. In turn, each CU represents the basic unit to which video encoder 20 may apply various coding tools. Video encoder may further split (i.e. partition) a CU into sub-CUs. Various examples of partitioning of CTUSs, e.g. into CUs and sub-CUs will now be described in greater detail FIG. 2 is a conceptual diagram illustrating a CU that is partitioned into leaf CUs. In the example of FIG. 2, an example CU 100 has a 2N×2N dimensionality, where N is a number of samples. As shown in FIG. 2, video encoder 20 may split CU 100 into up to four leaf CUs 102A-102D, such that each of leaf CUs 102A-102D has a dimensionality of N×N. In addition to the symmetric CU structure and split (partitioning) illustrated in FIG. 2, many other CU structures are possible in accordance with the HEVC specification, as well.

Figure 3A:
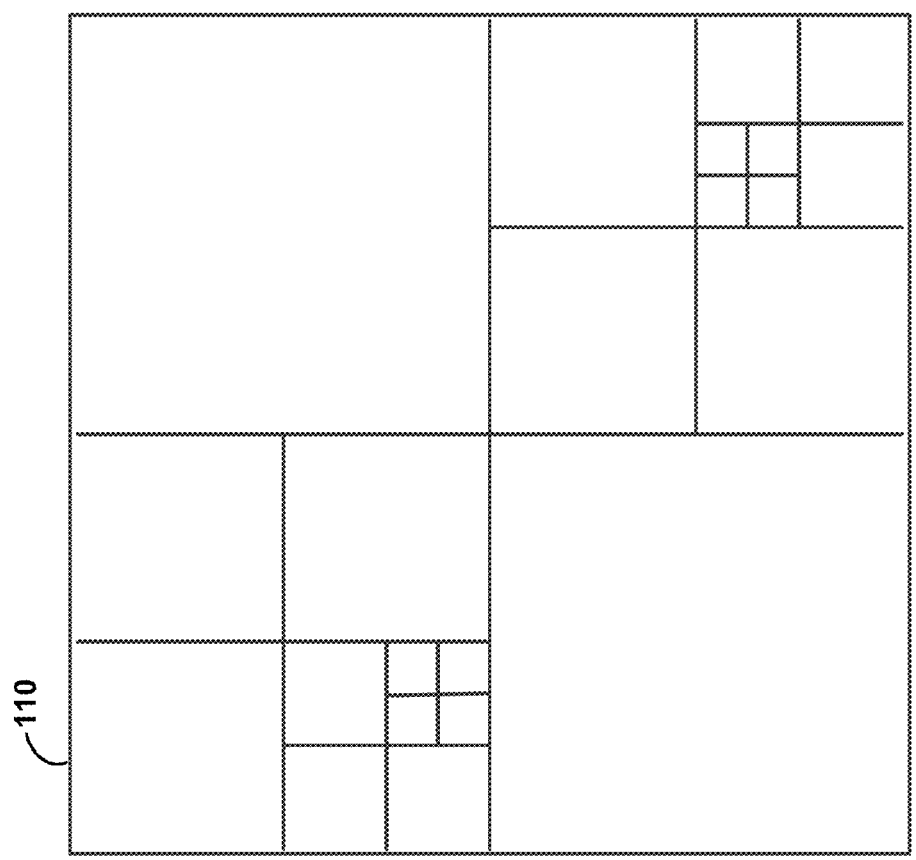
FIGS. 3A and 3B are conceptual diagrams illustrating example CUs that are partitioned according to various partitioning schemes.

FIG. 3A is a conceptual diagram illustrating a partitioned CTU. FIG. 3A includes CTU 110. In the example of FIG. 3A, example CTU 110 is partitioned into four CUs, which are indicated as the largest squares within CTU 110. The top-left and bottom-right of the four largest CUs are further split into four sub-CUs Within the bottom-right sub-CU of the top-left CU, the sub-CU is further partitioned into four sub-CUs, and the bottom right of these sub-CUs is again partitioned into four leaf-CUs. The bottom-right sub-CU of the bottom-right CU is partitioned using a similar partitioning scheme.

The purpose of FIG. 3A is to illustrate that video encoder 20 may split a CU into leaf CUs of various dimensionalities and depths. In other words, as shown in FIG. 3A, video encoder 20 may split CTU 110 into leaf CUs by halting the splitting process at different stages of the quad tree structure. At various instances of this disclosure, the structure of CTU 110 as illustrated in FIG. 3A is referred to as a CTU including CUs that are "multiply-split" into sub-CUs or leaf CUs. Each CU that results (either directly or indirectly) from splitting of another CU is referred to as a sub-CU of the CU from which it is split. A CU that is not further split into sub-CUs is referred to as a leaf CU.

Figure 3B:
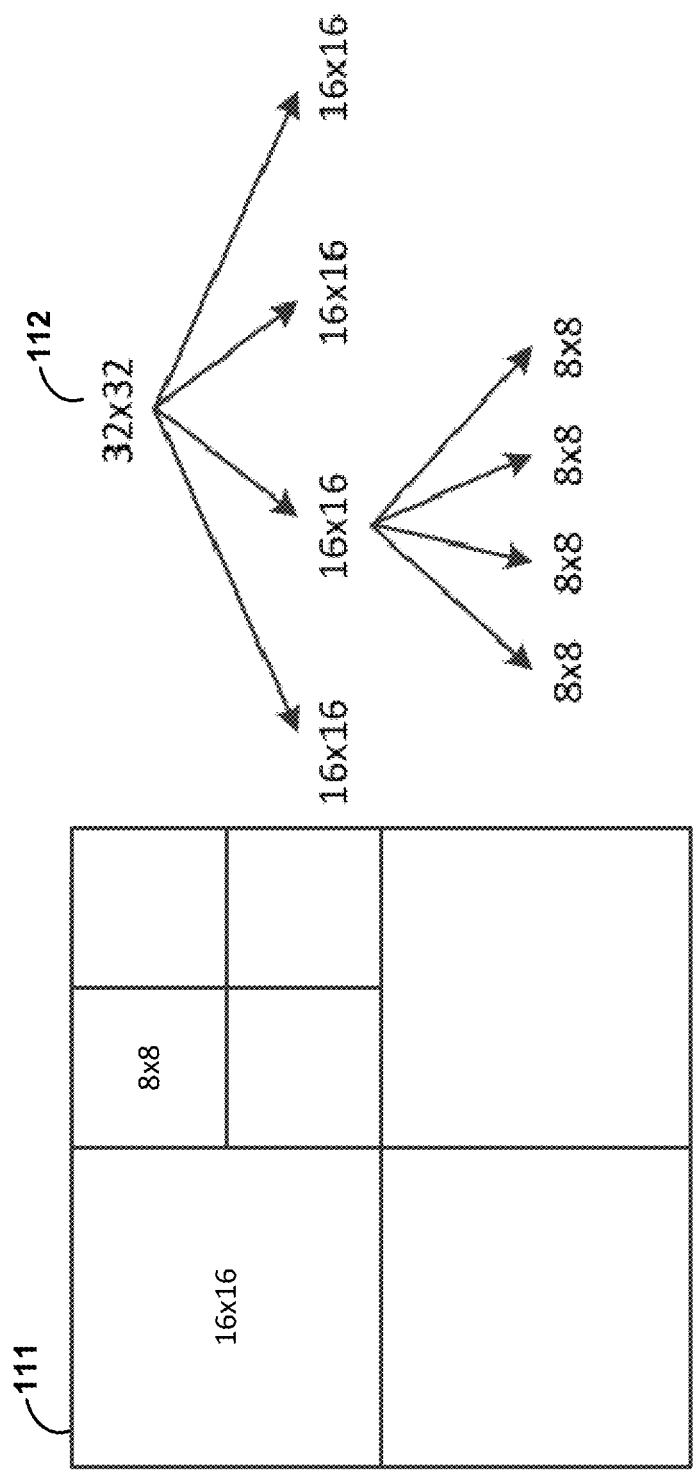

FIG. 3B is a conceptual diagram illustrating a CTU partitioning and a corresponding quadtree representation of the CTU. FIG. 3B illustrates an example CTU 111 and a corresponding quadtree structure 112. CTU 111 may have a 32×32 dimensionality in this example. In FIG. 3B, video encoder 20 has determined to split CTU 111 into sub-CUs that vary in dimensionality between 8×8 and 16×16. Video encoder 20 and video decoder 30 may represent CTU 111, using a corresponding quadtree data structure 112. In quadtree 112, the root node of quadtree is split into four nodes. In this example, each of the four nodes corresponds to a split of the 32×32 CTU into 16×16 sub-CUs. One of the 16×16 nodes, corresponding to the upper-right CU of the CTU is further split into four 8×8 sub-CUs.

The partitioning structure shown with respect to CTU 111 may improve coding efficiency. For example, video encoder 20 may select a smaller block size (e.g., 8×8 sub-CUs) for a complex region, while selecting a larger block size (e.g., 16×16 sub-CUs) for an area with little or no motion or a smooth texture area. According to HEVC reference software, video encoder 20 may determine the block size performing rate-distortion (RD) optimization, i.e., optimization of a required number of coding bits and an amount of distortion of the video image content. In general, a larger number of coding bits may be undesirable for bandwidth efficiency, whereas a larger amount of distortion may be undesirable for image quality and viewing experience. According to RD optimization, video encoder 20 may compare the RD costs of possible partitioning schemes against each other, and may select the partitioning scheme with the lowest (minimum) available cost.

While performing RD optimization according to HEVC can provide the optimal partition selection in terms of coding efficiency, testing all the possible partition may increase coding time significantly. In a practical system for real-time encoding, checking all the possible partition cases (i.e. dimensionalities and/or depths) may be resource-heavy and time consuming, and may not even be possible in some scenarios.

Alternatively, video encoder 20 may choose not to partition a CTU. However, when video encoder 20 skips partitioning CTU and uses a large block size to code a particular region, visual artifacts can occur. Visual artifacts may be especially likely to occur when different motion is exhibited between areas or objects in a large block. On the other hand, use of small partitions can decrease coding efficiency by coding motion and prediction mode information for all partitions, particularly in instances where a large block area exhibits relatively uniform motion. Therefore, it may be beneficial in various scenarios to partition a block without fully (e.g., exhaustively) checking the RD cost of possible partitioning schemes, particularly those with less degradation of subjective quality.

Figure 4:
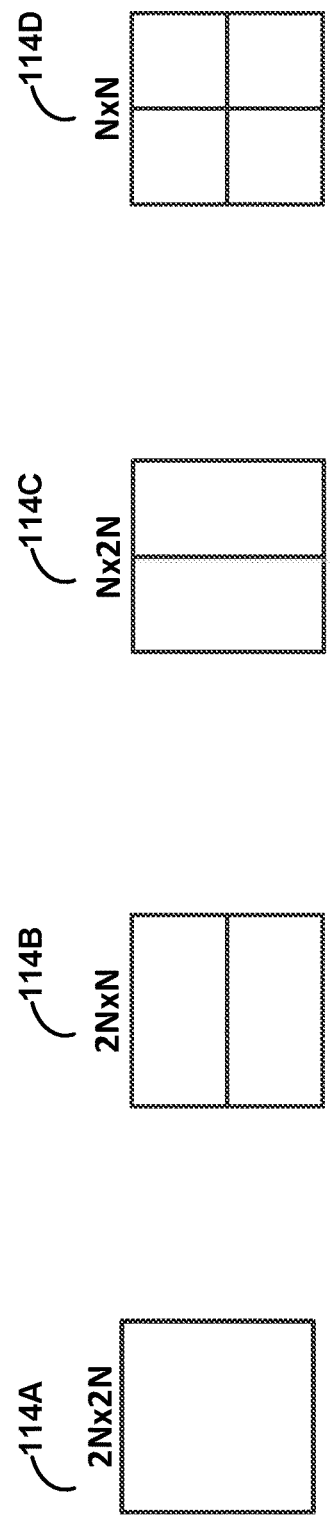
FIG. 4 is a conceptual diagram illustrating example sizes and splits for prediction units (PUs).

FIG. 4 is a conceptual diagram illustrating example sizes and splits for prediction units (PUs). In addition to sub-CUs that result from splitting of a CU, the CU may further include PUs. As described above, PUs may indicate prediction information. Each PU may be split (partitioned) into one or more blocks. Example sizes and splits for PUs are illustrated in FIG. 4, by way of the examples of PU partitions 114A-114D.

In the example of FIG. 4, PU 114A comprises a single block of size 2N×2N, PU 114B is partitioned horizontally into two blocks of size 2N×N, PU 114C is partitioned vertically into two blocks of size N×2N, and PU 114D is partitioned into four blocks of size N×N. Video encoder 20 may determine a prediction mode, and apply the determined prediction mode to one or more PUs. Examples of prediction modes according to the HEVC specification include the following: Intra mode, Skip mode, Merge Direct mode, or Advanced Motion Vector Prediction (AMVP) mode.

Video encoder 20 may select, derive, or otherwise determine a number of parameters for use of a particular prediction mode. For example, video encoder 20 may determine prediction directions for intra mode-coded PUs, or may determine merge candidates for skip, merge, and direct mode-coded PUs, or may determine reference frames and/or motion vectors for AMVP mode-coded PUs, etc. After prediction, video encoder 20 may determine residual coefficients. Video encoder 20 may partition the residual coefficients of a CU into TUs, so that video encoder 20 can apply transforms and/or quantization to each TU independently.

Figure 5:
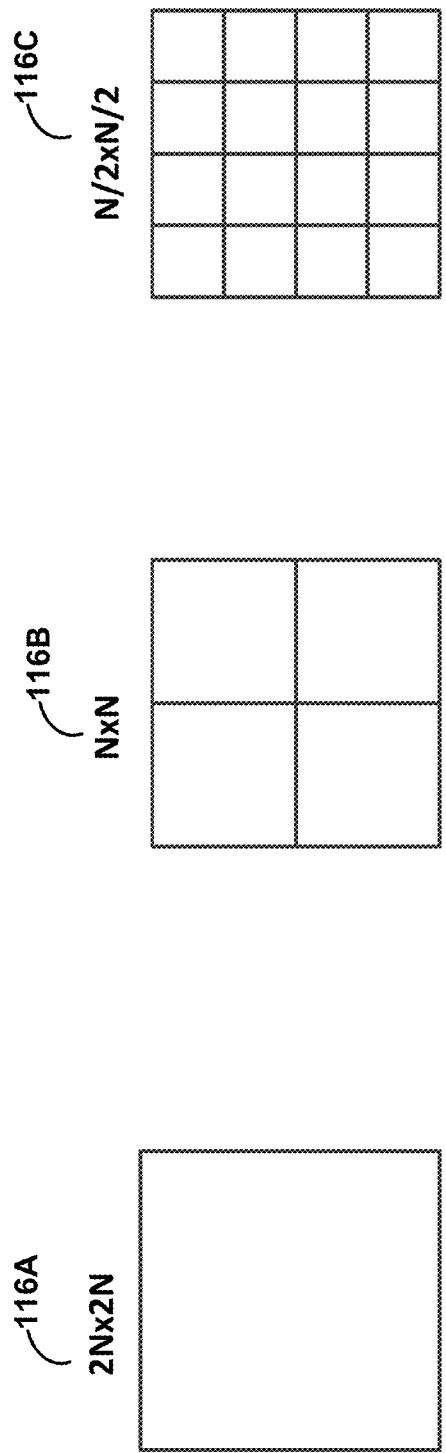
FIG. 5 is a conceptual diagram illustrating various example TU partitioning schemes.

FIG. 5 is a conceptual diagram illustrating various example TU partitioning schemes. A coding unit may include a transform tree. Transform trees 116A-116C illustrated in FIG. 5 are examples of such transform trees. The transform tree may comprise one or more TUs. Each of the TUs may include residual transform coefficient data resulting from a discrete cosine transform or another transform, as well as delta quantization parameter (QP) data. In the example of FIG. 5, video encoder 20 has determined a size for each TU. In transform tree 116A, the TU size may be 2N×2N samples. Transform tree 116B may comprise four TUs of size N×N samples, and transform tree 116C may comprise 16 TUs of size N/2×N/2 samples.

Video encoder 20 may implement existing techniques to select or otherwise determine an optimal partitioning scheme, coding mode, and/or coding parameters for a CTU. For instance, video encoder 20 may determine a partitioning scheme and a coding mode that improve (or potentially maximize) coding efficiency under one or more computational complexity constraints. To determine a partitioning scheme, video encoder 20 may perform a series of comparisons between two encoding modes, referred to herein as "m1" and "m2." The modes m1 and m2 may be based on, for example, CTUs having two different CU sizes, two different PU partitioning schemes, two different TU partitioning schemes, two different prediction modes for a PU, two different settings for a prediction mode, or any combination thereof.

Figure 6:
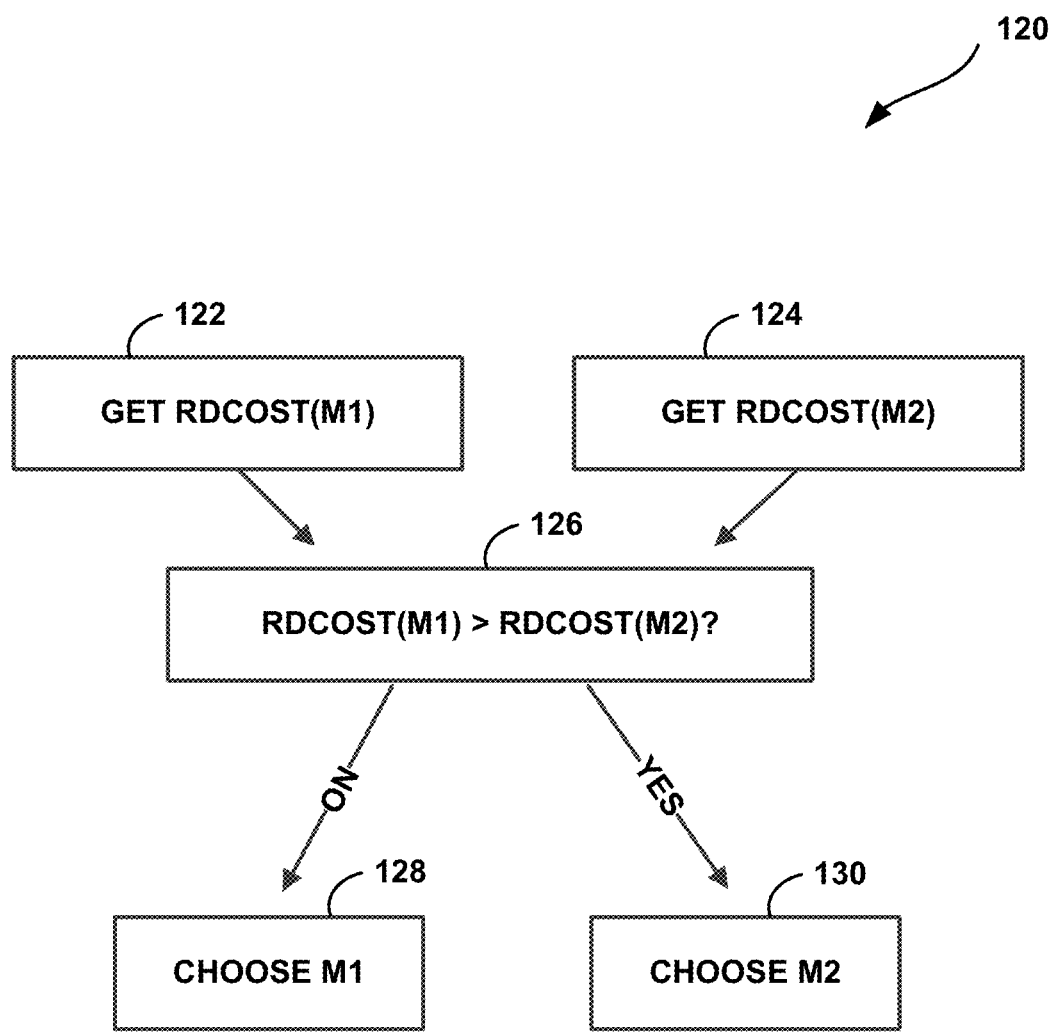
FIG. 6 is a flowchart illustrating an example process by which a video encoder may select a coding mode based on rate-distortion (RD) cost comparison, in accordance with the HEVC standard.

FIG. 6 is a flow diagram illustrating an exhaustive mode checking process. As part of the mode selection process. In general, video encoder 20 may determine or approximate rate distortion (RD) costs associated with the respective settings of two modes. The two modes are referred to herein as "m1" and "m2." The RD costs of modes m1 and m2 are denoted herein as "RDCost(m1)" and "RDCost(m2)." As illustrated in FIG. 6, video encoder 20 determines the costs, RDCost(m1) (122) and RDCost(m2) (124). Video encoder 20 then compares the associated costs RDCost(m1) with RDCost(M2) (126).

Video encoder 20 may select the encoding mode associated with the smaller RD cost. If RDCost(M1) is not greater than RDCost (M2), video encoder 20 chooses mode M1 (128). Otherwise, video encoder 20 chooses mode M2 (130). Process 120 represents an exhaustive mode checking process, as described herein. According to exhaustive mode checking techniques such as process 120, video encoder 20 checks modes m1 and m2 unconditionally, or in other words, without any consideration of already-available encoding information, statistics, or heuristics data.

Figure 7A:
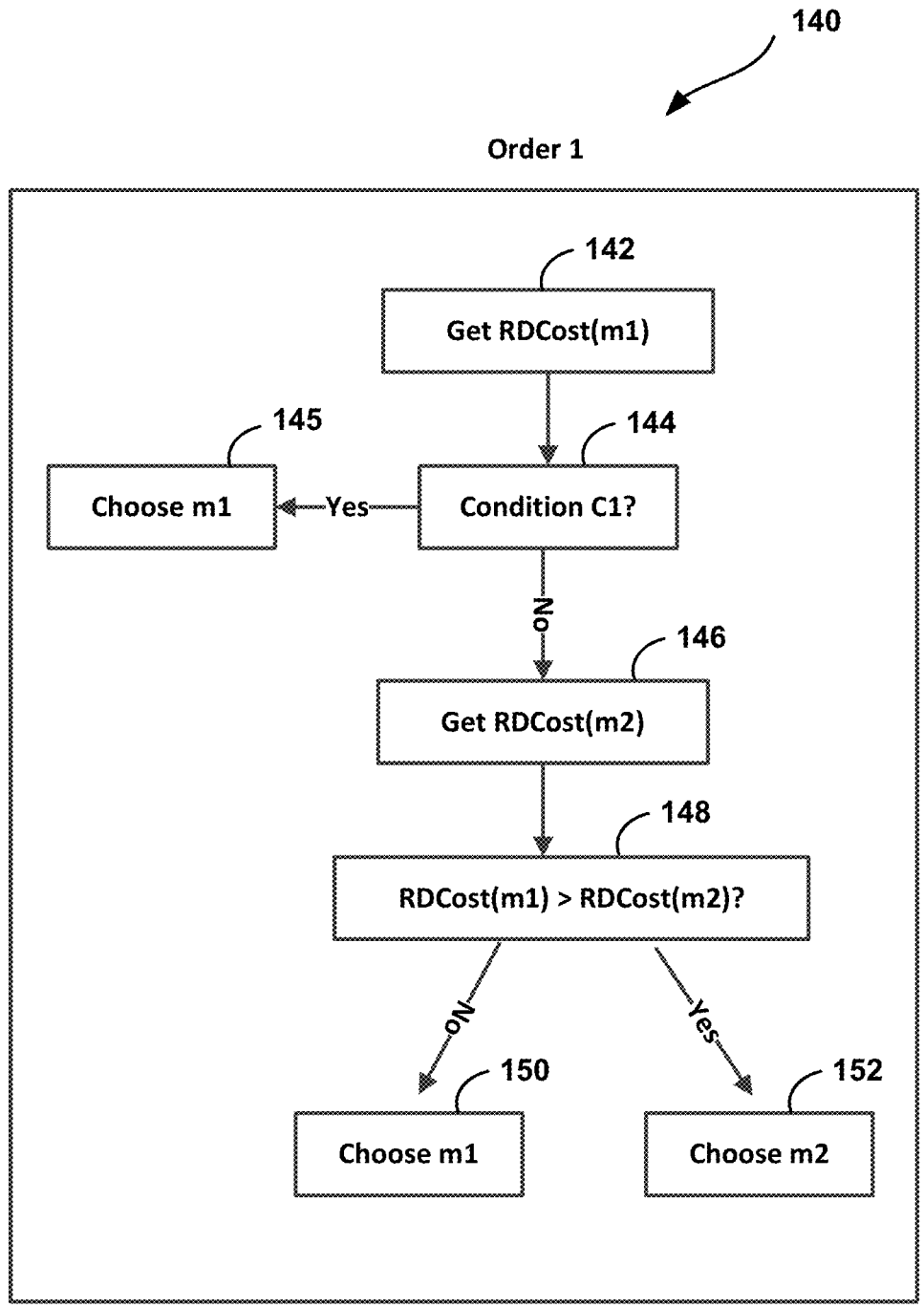
FIGS. 7A and 7B are flowcharts illustrating example mode selection techniques in accordance with various aspects of the HEVC specification.
Figure 7B:
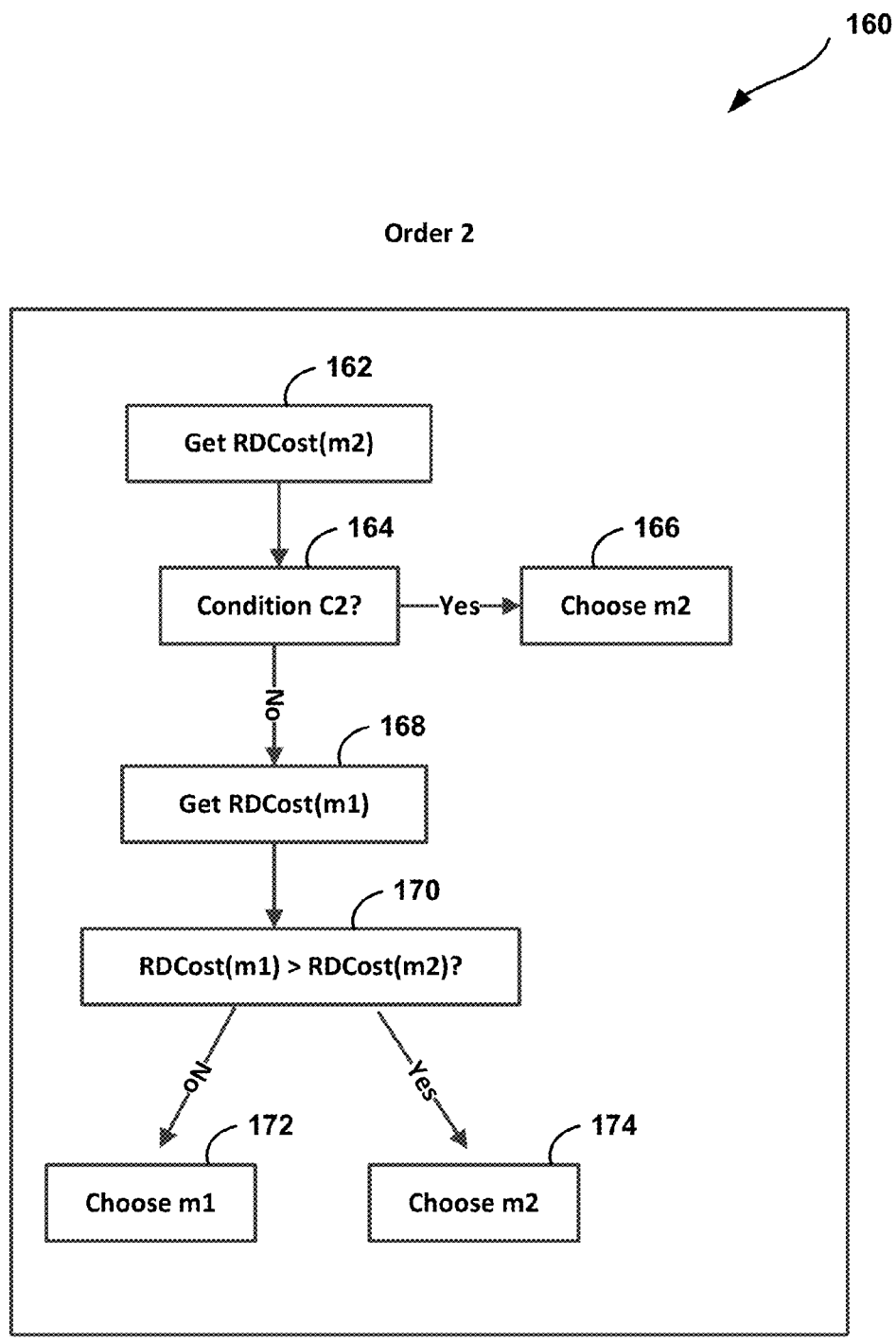

FIGS. 7A and 7B are conceptual diagrams illustrating example mode checking processes 140 and 160, respectively, in accordance with the techniques of this disclosure. Processes 140 and 160 represent mode selection techniques in accordance with various aspects of the HEVC specification. Video encoder 20 may perform either of processes 140 or 160 to implement "early termination" with respect to the mode checking and selection. For instance, video encoder 20 may perform process 140 or 160 to conditionally skip checking particular modes for viability, based on a particular condition being satisfied. In the example of process 160, video encoder 20 first checks the RD cost associated with mode m1 (142).

If the checked characteristics of mode m1 (in this case, the associated RD cost) meet or satisfy a certain condition (termed as "C1" herein) ("Yes" branch of block 144), video encoder 20 chooses mode m1 for encoding of the associated block (145). Thus, if video encoder 20 determines that the RD cost associated with mode m1 for the current block meets condition C1, then video encoder 20 may skip or bypass checking for the viability of mode m2 for encoding of the current block. However, if video encoder 20 determines that the RD cost of mode m1 for the current block fails to meet condition C1 ("No" block of 144), video encoder 20 checks the RD cost of m2 (146). In this scenario, video encoder 20 may compare the RD cost associated with mode m1 against the RD cost associated with mode m2 (148). In turn, video encoder 20 may select the mode associated with the lesser RD cost for encoding of the current block (150 or 152).

Process 160 of FIG. 7B represents an inverse of process 140 illustrated in FIG. 7A. For instance, video encoder 20 may perform process 160 to first check the RD cost associated with mode m2 (162). If the checked characteristics of mode m2 (in this case, the associated RD cost) meet or satisfy a certain condition (termed as "C2" herein) ("Yes" branch of 164), video encoder 20 chooses mode m2 for encoding of the associated block (166). Thus, if video encoder 20 determines that the RD cost associated with mode m2 for the current block meets condition C2 ("Yes" branch of 164), then video encoder 20 may skip or bypass checking for the viability of mode m1 for encoding of the current block and choose mode m2 (166). However, if video encoder 20 determines that the RD cost of mode m2 for the current block fails to meet condition C2 ("No" branch of block 164), video encoder 20 checks the RD cost of m1 (168). In this scenario, video encoder 20 may compare the RD cost associated with mode m2 against the RD cost associated with mode m1 (170). In turn, video encoder 20 may select the mode associated with the lesser RD cost for encoding of the current block (172 or 174).

The mode selection techniques as illustrated in FIGS. 7A and 7B represent fixed orders for mode checking. However, fixed order mode checking, as illustrated in FIGS. 7A and 7B, may present certain potential issues. One such potential issue is that fixed order mode checking may not offer the best complexity/quality tradeoff in all instances. In the context of process 140 of FIG. 7A, for example, if mode m1 is significantly more likely to be better than m2 in terms of complexity or quality, then the chances are small or slim for video encoder 20 to skip checking the preferable mode (in this case, mode m1) based on the RD cost of mode m2. Said another way, if mode m1 is preferable over m2 in an instance where video encoder 20 implements process 140, then process 140 successfully skews or biases the mode checking process in favor of selecting the advantageous mode without expending resources to evaluate the disadvantageous mode. Thus, in the particular scenario where mode m1 is advantageous over mode m2, process 140 offers a better complexity/quality tradeoff than process 160.

However, if mode m2 is likely to be better than m1 in terms of complexity or quality, then process 140 would skew/bias the mode selection process in favor of evaluating the disadvantageous mode in every instance, before even beginning an evaluation of the advantageous mode. Conversely, process 160 offers a better complexity/quality tradeoff in scenarios where mode m2 is likely to be better than m1 for encoding the current block. For instance, if mode m2 is likely to result in a lesser RD cost than mode m1 with respect to encoding the current block, then process 160 offers a better complexity/quality tradeoff than process 140.

Thus, existing mode checking orders in accordance with the HEVC specification may not offer the best available complexity/quality tradeoff in all instances. Techniques of this disclosure are directed to mitigating these risks, and to potentially improving the complexity quality tradeoff in a greater number of scenarios. To address the issues described above and to improve the complexity/quality tradeoff, video encoder 20 may implement one or more adaptive mode checking orders as described herein.

Figure 8:
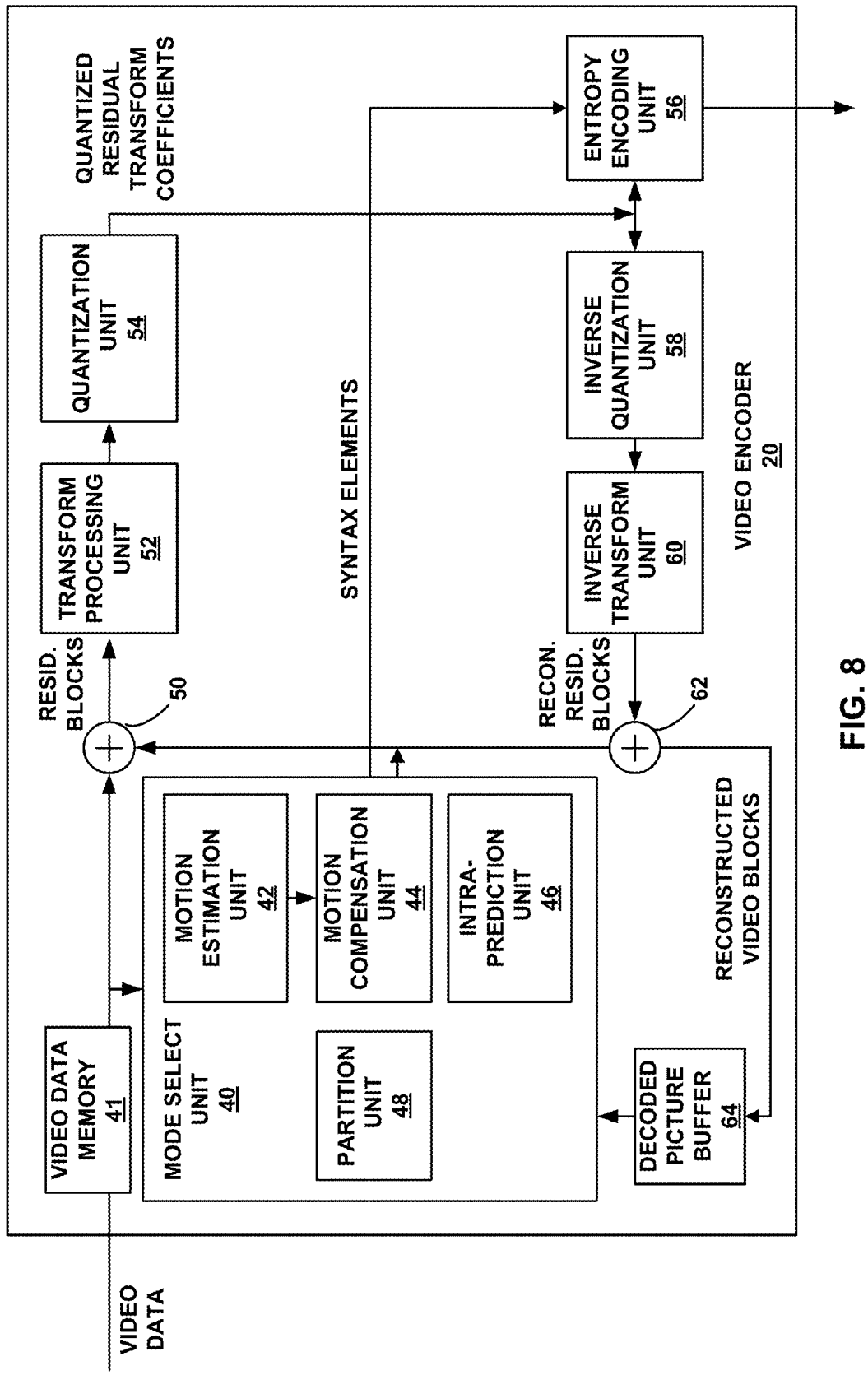
FIG. 8 is a block diagram illustrating an example of a video encoder that may perform techniques in accordance with one or more aspects of this disclosure.

FIG. 8 is a block diagram illustrating an example of a video encoder that may perform techniques in accordance with one or more aspects of this disclosure. In the example of FIG. 8, video encoder 20 includes video data memory 41, mode select unit 40, decoded picture buffer 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 8) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter). In some examples, a deblocking filter may be used to generate a filtered block of luma samples for inter-color component prediction, as described above.

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. In this way, video encoder 20 may receive a current video block within a video frame to be encoded.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Summer 50 may form a residual video block by determining differences between pixel values of the predictive block from the pixel values of the current video block being coded. In some examples, summer 50 may determine not to encode a residual block.

Partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Partition unit 48 may be configured to perform any of the fast or full RD checking modes described herein or combinations thereof. Mode select unit 40 may further produce a quadtree data structure indicative of partitioning of an LCU into sub-CUs. Leaf-node CUs of the quadtree may include one or more PUs and one or more TUs. Mode select unit 40 may be configured to perform any of the adaptive mode selection techniques described herein or combinations thereof.

Mode select unit 40 may select one of the coding modes, intra or inter, e.g., based on error results, and may provide the resulting intra- or inter-coded block to summer 50. Summer 50 may generate residual block data. For instance, summer 50 may generate residual block data for a current CU such that each sample of the residual block data is equal to a difference between a sample in a coding block of the current CU and a corresponding sample of a prediction block of a PU of the current CU. Summer 62 may reconstruct the encoded block (i.e., the coding block) for use as a reference frame. Mode select unit 40 also provides syntax elements, such as motion vectors, intra-mode indicators, partition information, and other such syntax information, to entropy encoding unit 56.

To address various issues described above with respect to mode checking orders of the HEVC specification, mode select unit 40 may implement various adaptively-ordered mode checking techniques of this disclosure. By adaptively changing mode checking order to better suit characteristics of a current block, mode select unit 40 may implement aspects of this disclosure to address the issues described above with respect to fixed order mode checking, and to potentially achieve better complexity/quality tradeoffs. The techniques of this disclosure enable mode select unit 40 and/or various other components of video encoder 20 to adaptively change a mode checking to achieve better complexity and/or quality tradeoffs. The techniques that mode select unit 40 may implement in accordance with this disclosure are described in further detail below, with respect to FIGS. 9-16.

Mode select unit 40 may determine a metric, such as an RD cost or a frequency metric. Mode select unit may determine whether the metric meets a condition. The condition may comprise threshold value, such as a threshold RD cost or a threshold frequency. The threshold frequency and/or metric may comprise a number of times or a rate that a particular mode checking order occurs in some examples. In various examples, the metric may be based on RD statistics and/or statistics associated with the frequency that a particular mode checking order was previously selected by mode select unit 40.

In accordance with the techniques of this disclosure, mode select unit 40 may be configured to: determine whether a metric meets a condition, wherein determining whether the metric meets the condition is based on statistics, wherein the statistics are associated with a first video encoding mode checking order and a second video encoding mode checking order, responsive to determining that the metric meets the condition, select a first encoding mode checking order to encode the first block of video data, responsive to determining that the condition is not met, select a second encoding mode checking order to encode the first block of video data, update the statistics based on the selected first encoding mode checking order or based on the second selected encoding mode checking order, and encode a second block, based on the updated statistics, and using the first or the second encoding mode checking order.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). In other words, a motion vector may indicate a displacement between a prediction block of a PU and a corresponding predictive block in a reference picture. A predictive block is a block that is found to closely match the block to be coded (i.e., the prediction block), in terms of pixel difference, which may be determined by sum of absolute difference (SAD), sum of square difference (SSD), or other difference metrics.

In some examples, video encoder 20 may calculate values for sub-integer pixel positions of reference pictures stored in decoded picture buffer 64. In other words, video encoder 20 may apply one or more interpolation filters to samples of one or more reference pictures to generate samples in a predictive block of a PU. In some examples, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 may calculate a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. If motion estimation unit 42 has calculated a motion vector, motion estimation unit 42 may send the calculated motion vector to entropy encoding unit 56 and motion compensation unit 44.

Motion compensation unit 44 may perform motion compensation. Motion compensation may involve fetching or generating one or more predictive blocks for a PU based on the one or more motion vectors determined for the PU by motion estimation unit 42. Again, motion estimation unit 42 and motion compensation unit 44 may be functionally integrated in some examples. Upon receiving a motion vector for a PU of a current video block, motion compensation unit 44 may locate a predictive block from a picture of one of the reference picture lists based on the motion vector. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and may select the intra-prediction mode having the best rate-distortion characteristics among the tested intra-prediction modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 may form a residual video block by determining differences between prediction data (e.g., a predictive block) from mode select unit 40 and data from an original video block (e.g., a coding block) being coded. Summer 50 represents the component or components that perform this difference operation. Transform processing unit 52 may apply a transform to the residual block, producing a video block (i.e., a transform coefficient block) comprising residual transform coefficient values. For example, transform processing unit 52 may apply a discrete cosine transform (DCT) or a conceptually similar transform to produce the residual coefficient values.

Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel (or sample) value domain to a transform domain, such as a frequency domain. Transform processing unit 52 may send the resulting transform coefficients to quantization unit 54.

Furthermore, transform unit 52 may apply an ACT (adaptive color transform) transform, and/or CCP (cross-component prediction) transform to the residual data. Furthermore, in accordance with one or more techniques of this disclosure, transform unit 52 may apply clipping operations to residual data to reduce bit depths of residual data resulting from the sample-to-transform domain transform, the ACT transform, and/or the CCP transform.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Video encoder 20 may encode various parameter sets in a coded video bitstream. Such parameter sets may include a picture parameter set (PPS), which may include syntax elements that are common to one or more pictures, a sequence parameter set, which may include syntax elements that are common to one or more sequences of pictures.

Following quantization, entropy encoding unit 56 entropy codes the quantized transform coefficients. In other words, entropy encoding unit 56 may entropy encode syntax elements representing the quantized transform coefficients. For example, entropy encoding unit 56 may perform context adaptive binary arithmetic coding (CABAC), context adaptive variable length coding (CAVLC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, video decoder 30 may transmit the encoded bitstream to another device (e.g., video decoder 30) or archived for later transmission or retrieval.

In addition to entropy coding quantized transform coefficients, entropy encoding unit 56 may be configured to entropy encode a scale factor. In various examples, entropy encoding unit 56 may be configured to signal the scale factor (alpha) value as a fixed-length code in bypass mode of a CABAC coder.

Inverse quantization unit 58 and inverse transform unit 60 apply inverse quantization and inverse transformation, respectively, to reconstruct the residual block in the pixel domain, e.g., for later use as a reference block. For instance, inverse quantization unit 58 may dequantize a transform coefficient block. Inverse transform unit 60 may reconstruct a transform block for a TU by applying an inverse transform to the dequantized transform coefficient block.

Summer 62 adds the reconstructed residual block to the motion compensated prediction block produced by motion compensation unit 44 to produce a reconstructed video block for storage in decoded picture buffer 64. Motion estimation unit 42 and motion compensation unit 44 may use the reconstructed video block as a reference block to inter-code (i.e., inter predict) a block in a subsequent video frame. Motion compensation unit 44 may also apply one or more interpolation filters to the reconstructed residual block to calculate sub-integer pixel values for use in motion estimation.

Motion estimation unit 42 may determine one or more reference pictures, that video encoder 20 may use to predict the pixel values of one or more For PUs that are inter-predicted. Motion estimation unit 42 may signal each reference picture as an LTRP or a short-term reference picture. Motion estimation unit 42 may store the reference pictures in a decoded picture buffer 64 until the pictures are marked as unused for reference. Mode select unit 40 of video encoder 20 may encode various syntax elements that include identifying information for one or more reference pictures.

Figure 9:
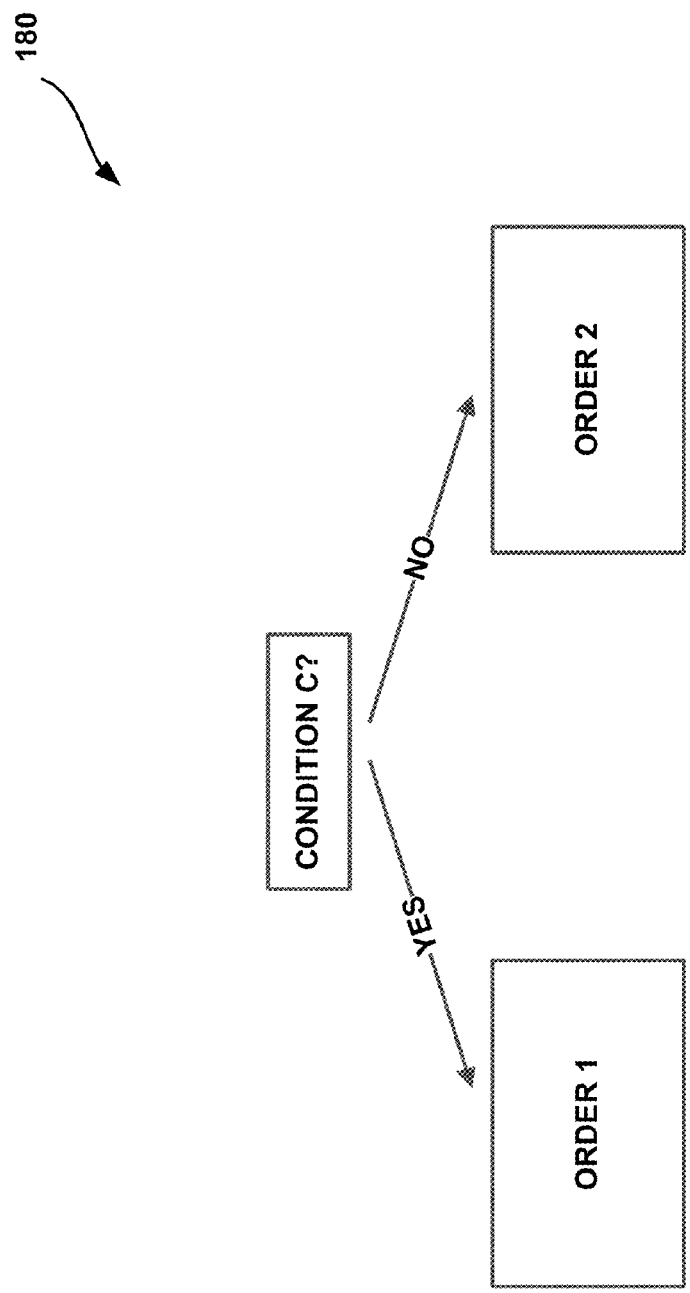
FIG. 9 is a flowchart illustrating an example process that a video encoder may perform to adaptively select a mode checking order, in accordance with one or more aspects of this disclosure.

FIG. 9 is a flowchart illustrating an example process that a video encoder may perform to adaptively select a mode checking order, in accordance with one or more aspects of this disclosure. FIG. 9 illustrates a process 180 that mode select unit 40 may implement, in accordance with various aspects of this disclosure. Mode select unit 40 may implement process 180 for adaptive order mode checking. For instance, mode select unit 40 may determine the order for video mode checking based on a condition (denoted as "C"

in FIG. 9). More particularly, mode select unit may determine whether a metric, such as a rate-distortion metric, satisfies condition C. Condition C may be a rate-distortion value in some examples. "Order 1" corresponds to the mode checking order illustrated in FIG. 7A with respect to process 140, and "order 2" corresponds to the mode checking order illustrated in FIG. 7B with respect to process 160. Condition C may be designed in such a way that the mode selection of process 180 is skewed or biased in favor of mode select unit 40 selecting the branch with expected better complexity/quality. Mode select unit or other component(s) of video encoder 20 may also adjust condition C adaptively, based on available information. Examples of available information that mode select unit 40 may use to adaptively adjust condition C include statistics of previous pictures, pre-analysis information for the current picture, and information from neighbor blocks or for modes that were previously checked.

Additionally, mode select unit 40 may calibrate and/or tune condition C jointly with conditions C1 (144) and C2 (164) described above with respect to FIGS. 7A and 7B, respectively. Compared to implementing one of the fixed order mode checking techniques illustrated in either FIG. 7A or FIG. 7B, the adaptive order selection for mode checking of process 180 of FIG. 9 may offer a complexity reduction with respect to the operation of mode select unit 40. In some scenarios, process 180 illustrated in FIG. 9 may offer a complexity reduction of approximately twenty percent (20%) as compared to either of processes 140 or 160. Mode select unit 40 may implement process 180 on top of, or prior to, various types mode checking scenarios.

Figure 10:
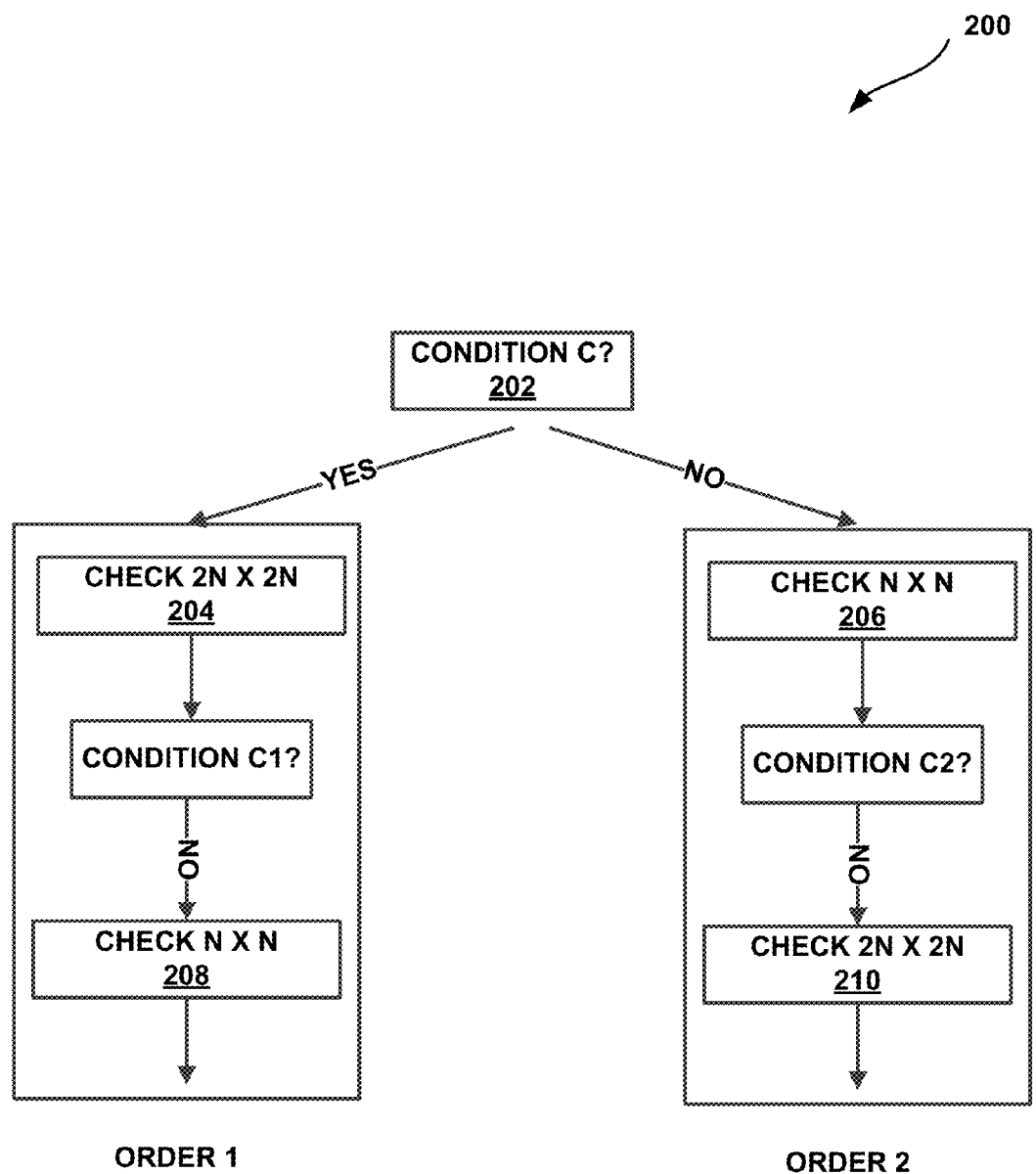
FIG. 10 is a flowchart illustrating an example process that a video encoder may perform to select between two possible orders to check CU size, in accordance with one or more aspects of this disclosure.

FIG. 10 is a flowchart illustrating an example process 200, in which mode select unit 40 selects between two possible orders to check CU size. More specifically, mode select unit 40 may implement process 200 to adaptively order CU size checking. The left ('YES') branch of process 200 represents a particular instance of "order 1" of process 180 of FIG. 9. Similarly, the right ('NO') branch of process 200 represents a particular instance of "order 2" of process 180 of FIG. 9.

In the example of process 200, mode select unit 40 may adaptively order checking of various CU different sizes. More specifically, mode select unit 40 may implement process 200 to determine whether a 2N×2N CU size should be checked first (order 1)(204) or an N×N CU should be checked first (order 2, 206). In relation to process 120 of FIG. 6, mode m1 may represent checking the 2N×2N CU first (204), while mode m2 may represent checking four (4) N×N sub-CUs first (206). To determine condition C, video encoder 20 may perform a low cost motion estimation of a 2N×2N CU, thus obtaining the corresponding prediction error. If the error energy of the prediction error obtained from the motion estimation is smaller than a lower threshold ("t1"), then video encoder 20 may determine that the current block is likely to be a background block or a block moving as a whole (e.g., "moving together"), and condition C1 is met. In this case, video encoder 20 is unlikely to split the 2N×2N CU, based on the shared motion information indicated by the low error energy across the CU. On this basis, process 200 may skew or bias the order checking in favor of mode select unit 40 first checking the 2N×2N CU (204), and conditionally checking the N×N sub-CUs (order 1) (208).

However, if video encoder 20 determines that the error energy exceeds a greater threshold ("t2"), the block may be complex, and thus, video encoder 20 is likely to use a smaller block size in encoding. In this scenario, process 200 skews/biases the order selection in favor of mode select unit 40 checking four (4) N×N sub-CUs first (206), and conditionally checking the 2N×2N CU as a whole (210).

In the case that video encoder 20 determines that a metric, such as an RD cost, meets C1 or C2, video encoder 20 or may terminates checking order 1 or checking order 2, respectively. As an example, if the RD cost associated with a 2N×2N CU size is less than a threshold RD cost (e.g., C1), then video encoder 20 may select the 2N×2N CU partitioning, and does not check the N×N CU partition size.

Figure 11:
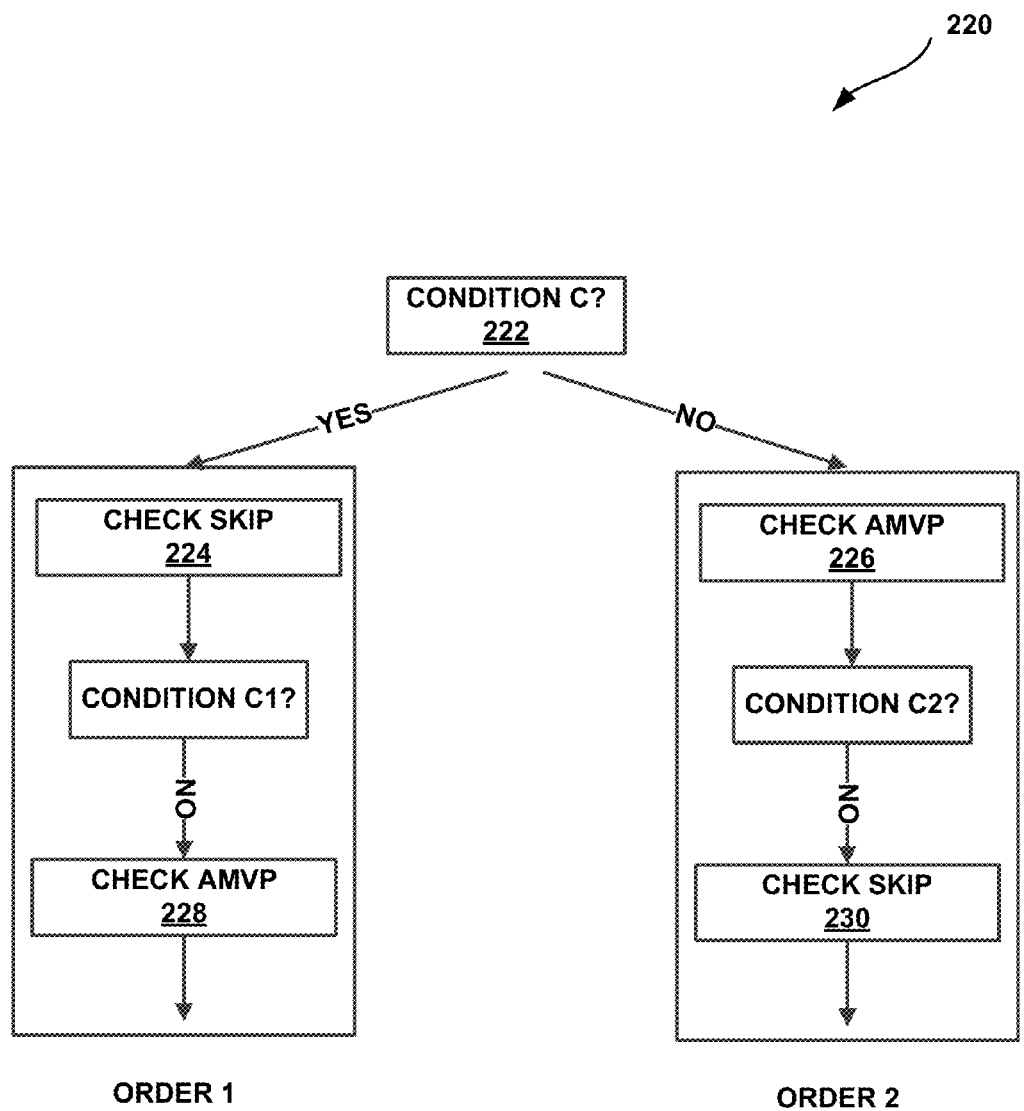
FIG. 11 is a flowchart illustrating another example process that a video encoder may perform for adaptive ordering of prediction mode selection in accordance with the techniques of this disclosure.

FIG. 11 is a flowchart illustrating another example process that a video encoder may perform for adaptive ordering of prediction mode selection in accordance with the techniques of this disclosure. In FIG. 11, according to process 220, mode select unit 40 may adaptively check the prediction mode to be used for a PU, with modes m1 and m2 of FIG. 6 corresponding to two different prediction modes. In some examples, process 220 represents a process that video encoder 20 may implement with respect to prediction structure for temporal layer support.

In the specific example of FIG. 11, modes m1 and m2 (described above) correspond to AMVP mode and SKIP mode, respectively. It will be appreciated that AMVP and SKIP modes are illustrated in FIG. 11 as non-limiting examples, and that the adaptive ordering techniques of this disclosure can be applied to support a number of possible combinations and permutations of prediction modes. By adaptively ordering prediction mode checking for a PU according to process 220, video encoder 20 may, in various instances, support prediction for temporal layers of video data.

Video encoder 20 may support three temporal layers for encoding a picture. Some pictures can only be uni-predicted, and the one reference picture may be positioned relatively far away (i.e., significantly different) from the current picture. As a result, video encoder 20 may be less likely to select SKIP mode for encoding such a picture. In such instances, techniques of this disclosure may skew or bias mode checking order such that mode select unit evaluates AMVP mode first, and conditionally evaluates SKIP mode. A bi-predicted frame, however, may be predicted from two reference pictures that are relatively (visually) close to the bi-predicted frame. For bi-predicted pictures, SKIP mode may be the dominant choice. Thus, in the case of a bi-predicted picture, mode select unit 40 may bias the order checking process in favor of checking the SKIP mode first.

For yet some other frames, mode select unit 40 may yield a better complexity/quality tradeoff by checking SKIP mode first for low motion sequences, and by checking AMVP first for high motion sequences. In scenarios where mode select unit 40 selects between SKIP mode and AMVP mode, mode select unit may formulate condition C (222) to be based on numbers of occurrences of SKIP mode and AMVP mode in a previously coded picture associated with a time instance T1 that is different from the time instance of the current picture. In other words, to select between SKIP mode and AMVP mode, mode select unit 40 may check SKIP mode first (224) if the occurrence of SKIP mode coding is prevalent or more frequent in blocks of the picture at time T1. Conversely, mode select unit 40 may implement the techniques of this disclosure to check AMVP mode first (226) if the occurrences of AMVP mode coding is more frequent or prevalent in blocks of the picture at time T1.

After checking skip mode for a CU in order 1 (224), if a condition C1 is not met, mode select unit 40 may check AMVP mode (228). Conversely in order 2, after mode select unit 40 checks AMVP mode (226), if a condition C2 is not met, mode select 40 checks SKIP mode for a CU (230). In this manner, mode select unit 40 may implement the adaptively ordered mode checking techniques of this disclosure to leverage heuristic data available from pictures that are already encoded.

After checking SKIP mode in order 1 (224), or AMVP mode in order 2 (226), video encoder 20 may determine an RD cost (metric) of the checked mode. If the RD cost metric is less than a threshold cost, (e.g., C1, or C2), which may correspond to the "Yes" branch of Conditions C1 or C2, video encoder 20 may select the video coding mode that satisfies the condition (e.g., C1 or C2), and stop checking RD costs for other video coding modes.

Figure 12:
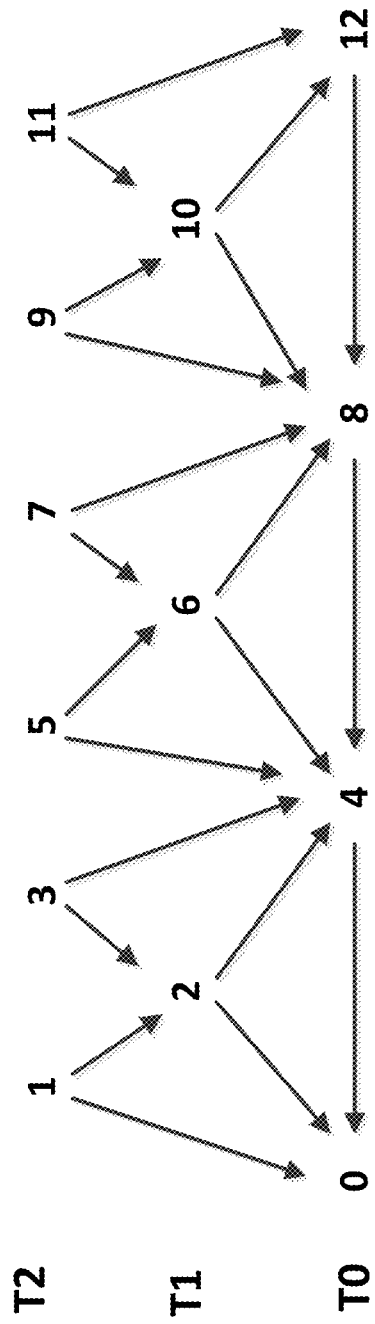
FIG. 12 is a conceptual diagram illustrating an example prediction structure for temporal layer support in accordance with aspects of this disclosure.

FIG. 12 is a conceptual diagram illustrating an example prediction structure for temporal layer support in accordance with aspects of this disclosure. Applying the example of process 220 of FIG. 11, mode select unit 40 may select between SKIP mode and AMVP mode for encoding the current block. As shown in FIG. 11, video encoder 20 may support three temporal layers of video data, denoted as T0, T1, and T2. Each of the numbers 1-12 may correspond to a picture associated with that temporal layer.

The prediction structure shown in FIG. 12 may be described as follows: for pictures in temporal layer T0, a picture having a number N, where N is equal to: 0, 4, 8, . . . , etc., can only predict another picture having value N−4. For pictures of temporal layer T1, frames having N equal to: 2, 6, 10, . . . , etc., can be used to predict frames having values equal to N1−2 and (N2+2). Pictures of temporal layer T2 having a value N equal to: 1, 3, 5, 7, . . . , etc., can be used to predict pictures having values N−1 and N+1.

Thus, a picture of layer T0 can only be uni-predicted. Reference pictures for pictures of layer T0 are relatively far away relative to pictures of layers T1 and T2. As a result of this prediction scheme, Layer T1 is more likely to be predicted based on other pictures and therefore less likely to be encoded optimally using SKIP mode. As such, mode select unit 40 may be less likely to select SKIP mode for a uni-predicted frame in temporal layer T1. Thus, mode select unit 40 may implement the adaptive checking order of this disclosure to skew the selection process in favor of AMVP mode being checked first (unconditionally) for pictures of layer T1.

However, a picture of temporal layer T2 may be bi-predicted, such that the two reference frames are very close. So, a frame of temporal layer T2 can be predicted relatively accurately using bi-prediction, and SKIP mode may be the dominant coding mode for such a frame. In the case of a bi-predicted frame in temporal layer T2, the advantageous mode checking process would include checking SKIP mode first (unconditionally). Thus, mode select unit 40 may implement the adaptive ordering techniques of this disclosure to skew the mode checking order in favor of checking the SKIP mode first (unconditionally).

In the case of frames in temporal layer T1, mode select unit 40 may be configured to bias the mode checking order in favor of checking the SKIP mode first for low motion sequences and AMVP first for high motion sequences. Mode select unit 40 may formulate condition C as illustrated in process 220 of FIG. 11 based on occurrences of SKIP mode and AMVP mode in a previous frame of temporal layer T1. For instance, mode select unit 40 may leverage heuristic data from the previous frame in the display order of temporal layer T1 to check SKIP mode first if occurrences of SKIP mode encoding are more frequent in the previous frame than occurrences of AMVP mode encoding.

FIGS. 13A and 13B are conceptual diagrams illustrating error distributions for corresponding 8×8 CUs that a video encoder may use to adaptively determine a PU partitioning scheme, in accordance with one or more aspects of this disclosure. FIGS. 13A and 13B illustrate error prediction distributions 240A and 240B respectively, for corresponding 8×8 CUs. In accordance with examples of the techniques of this disclosure, video encoder 20 may adaptively determine a PU partitioning scheme based on the error distributions. For instance, video encoder 20 may implement the techniques to determine a PU partition size based on the coefficient energy of a block.

In one example use case, video encoder 20 has already checked an 8×8 PU, and video encoder 20 must select between checking an 8×4 PU first or checking an 4×8 PU first. If the 8×8 PU prediction error energy is concentrated in the bottom half of the 8×8 CU (when the 8×8 PU is bifurcated latitudinally) as shown in FIG. 13A, the energy distribution usually indicates that the bottom half of the 8×8 PU moves differently relative to the top half Based on these tendencies of the energy distribution of error distribution 240A, mode select unit 40 may determine that video encoder 20 is more likely to partition the 8×8 PU into two 8×4 (2N×N) PUs. In turn, mode select unit 40 may skew/bias the adaptively ordered mode checking techniques of this disclosure in favor of checking the 2N×N partitioning scheme first, i.e., before other partitioning schemes.

In the example of FIG. 13B, error distribution 240B, the prediction error energy is concentrated in the right half of the 8×8 PU (when the 8×8 PU is bifurcated longitudinally) as shown in FIG. 13B. The energy distribution of error distribution 240B usually indicates that the right half of the 8×8 PU moves differently relative to the left half. Based on these tendencies of the energy distribution of error distribution 240B, mode select unit 40 may determine that video encoder 20 is more likely to partition the 8×8 PU into two 4×8 (N×2N) PUs. Thus, mode select 40 may skew/bias the adaptively ordered mode checking techniques of this disclosure in favor of checking the N×2N partitioning scheme first.

Figure 14:
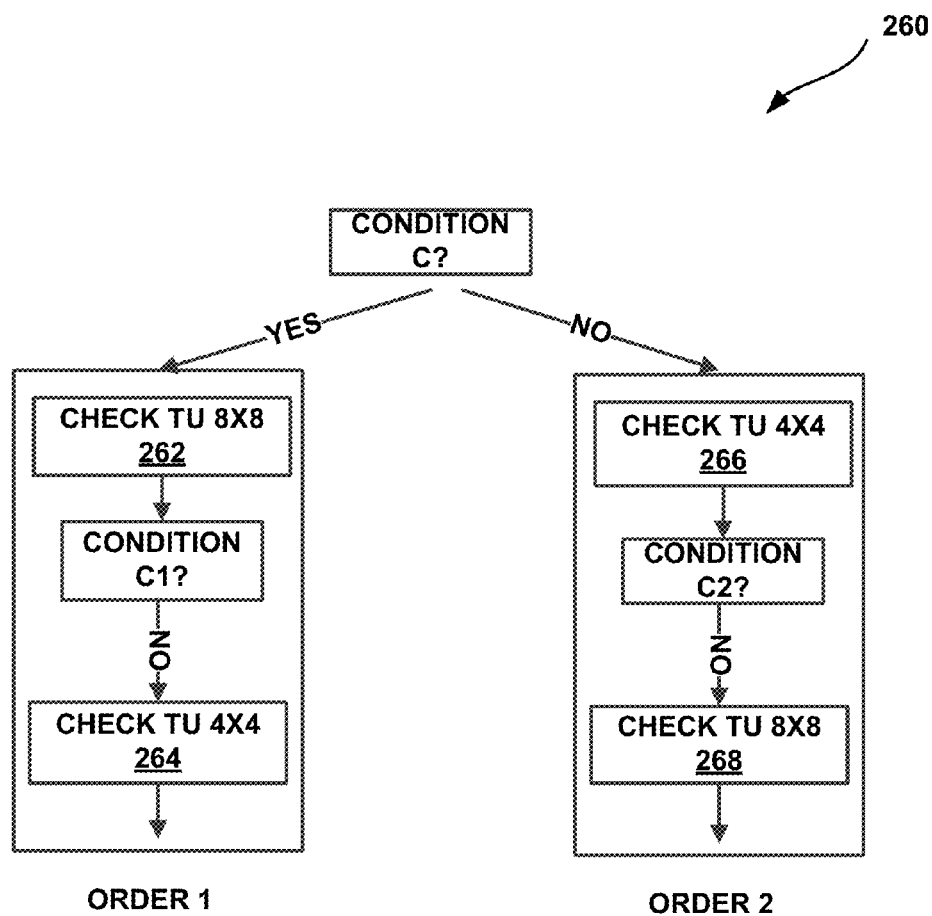
FIG. 14 is a flowchart illustrating an example process which a video encoder may implement to adaptively determine a TU partitioning scheme, in accordance with aspects of this disclosure.

FIG. 14 is a flowchart illustrating an example process 260, which video encoder 20 may implement in accordance with aspects of this disclosure to adaptively determine a TU partitioning scheme. Video encoder 20 may determine the TU partitioning scheme based on a condition, C. Video encoder 20 may determine whether an RD cost metric is less than or greater than a threshold value comprising condition C. If video encoder 20 determines that condition C is met, video encoder 20 checks an 8×8 TU size first (262), and determines an RD cost for the 8×8 TU size. If another condition C1 is not met, video encoder 20 then checks a 4×4 TU size (264). If C is not met, video encoder 20 checks a 4×4 TU size first (266), and determines an RD cost associated with the 4×4 TU size. If a condition C2 is not met, video encoder 20 checks an 8×8 TU size (268).

If video encoder 20 determines that the RD costs associated with 8×8TU size (262), and 4×4 TU size (266), satisfy condition C1 or C2 respectively, video encoder 20 terminates the video encoding mode checking process. That is, video encoder 20 may select an 8×8 TU size for a block if the associated RD cost is less than a threshold cost C1. Similarly, video encoder 20 may select a 4×4 TU size if the associated RD cost is less than a threshold cost C2. If either C1 or C2 is satisfied, video encoder 20 ceases checking other TU partition sizes.

Video encoder 20 may implement process 260 to adaptively determine the TU partitioning scheme based on coefficient energy of a block. More specifically, video encoder 20 may implement process 260 to determine which TU partition is to be checked first for a CU, where modes m1 and m2 are associated with two different ones of TU partitioning schemes 116A-116C illustrated in FIG. 5. In the example of process 260 of FIG. 14, the two TU sizes to be evaluated are 8×8 and 4×4.

FIGS. 15A and 15B are conceptual diagrams illustrating prediction error distributions. Video encoder 20 may also use prediction error distribution to determine which TU size should be checked first in the algorithm described above. FIGS. 15A and 15B illustrate error distributions 280A and 280B, respectively. FIG. 15A illustrates prediction errors for an 8×8 bock (by way of error distribution 280A). Error distribution 280A is relatively uniform, and thus, the 8×8 transform is usually better from an encoding standpoint than further partitioning. Thus, with respect to error distribution 280A, checking the 8×8 TU first represents the more beneficial option. Thus, mode select unit 40 may implement the adaptive ordering techniques described herein to skew or bias the ordering process in favor of checking the 8×8 TU first.

However, if prediction error of one 4×4 block is predominant in the larger 8×8 block (as is the case in error distribution 280B of FIG. 15B), using an 8×8 transform may spread out error energy across the entire 8×8 block, instead of compacting the error energy into the coefficient regions where the energy is predominantly positioned. Thus, an 8×8 transform size may result in more non-zero coefficients being coded and produce blurring artifacts, in the case of error distribution 280B. In the case of error distribution 280B, mode select unit 40 may adaptively order the TU size checking process to bias the selection in favor of checking the 4×4 transform size first.

Figure 16:
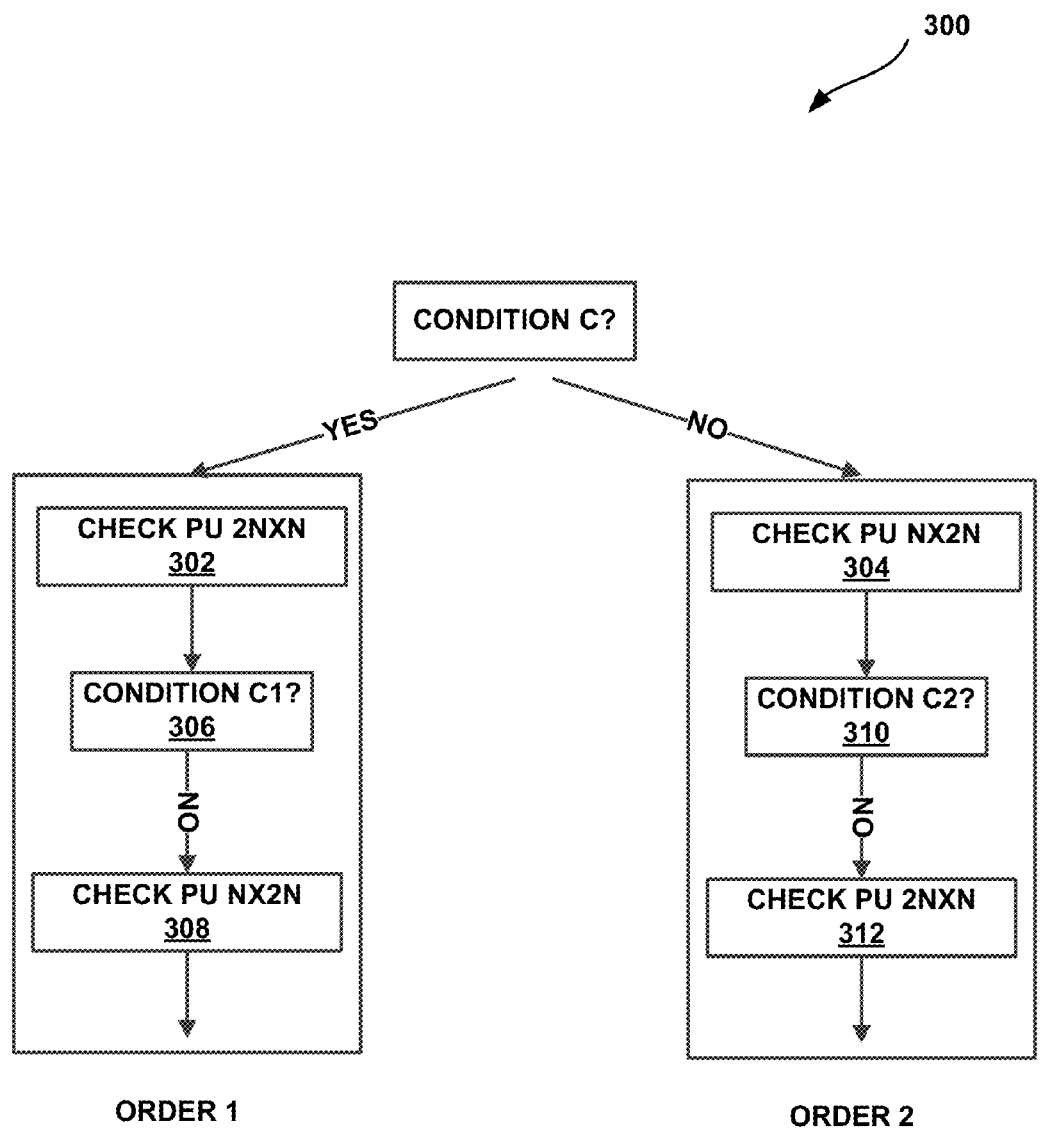
FIG. 16 is a flowchart illustrating an example process that a video encoder may implement to adaptively determine a PU partitioning scheme, in accordance with aspects of this disclosure.

FIG. 16 is a flowchart illustrating an example process 300 that video encoder 20 may implement to adaptively order checking of prediction modes for a PU. In the example of process 300, mode select unit 40 selects between modes m1 and m2 corresponding to PU partition sizes 2N×N (302) and N×2N (304), respectively. An example of the PU partition sizes that video encoder 20 evaluates in process 300 are illustrated in FIGS. 13A and 13B. For instance, error distribution 240A of FIG. 13A may represent a distribution for which order 1 is beneficial, while error distribution 240B of FIG. 13B may represent a distribution for which order 2 is beneficial, in the context of process 300.

In order 1, after mode select unit 40 checks a 2N×N partitioning and determines an associated RD cost, mode select unit 40 checks whether the RD cost meets a condition, denoted as C1 (306). If mode select unit 40 determines that C1 is not met, mode select unit 40 checks a N×2N PU partitioning (308). In order 2, after mode select unit 40 checks an N×2N partitioning (304) and determines an RD cost associated with the N×2N partitioning, mode select unit 40 checks condition C2 (310). If mode select unit 40 determines that C2 is not met, mode select unit 40 checks a PU 2N×N partitioning (312). If video encoder 20 determines that conditions C1 or C2 are met, e.g. that an RD cost associated with the 2N×N PU size (302), or the RD cost associated with the N×2N Pu size (304) is less than a threshold RD cost, video encoder 20 may terminate the PU partition size checking order.

In this manner, video encoder 20 may represent an example of a device configured to adaptively determine a first video encoding parameter for a block of video data based on statistics associated with the first video encoding parameter, determine whether a metric associated with the first video encoding parameter meets a condition associated with the video encoding parameter, if the first video encoding parameter meets the condition, use a first encoding mode checking order associated with the first video encoding parameter to encode the block, if the first video coding parameter does not meet the condition, use a second encoding mode checking order associated with a second video encoding parameter to encode the block, update the statistics associated with the first encoding parameter and the statistics associated with the second encoding parameter, and adaptively encode a second block using the updated statistics associated with the first video encoding parameter and the second video encoding parameter.

Figure 17A:
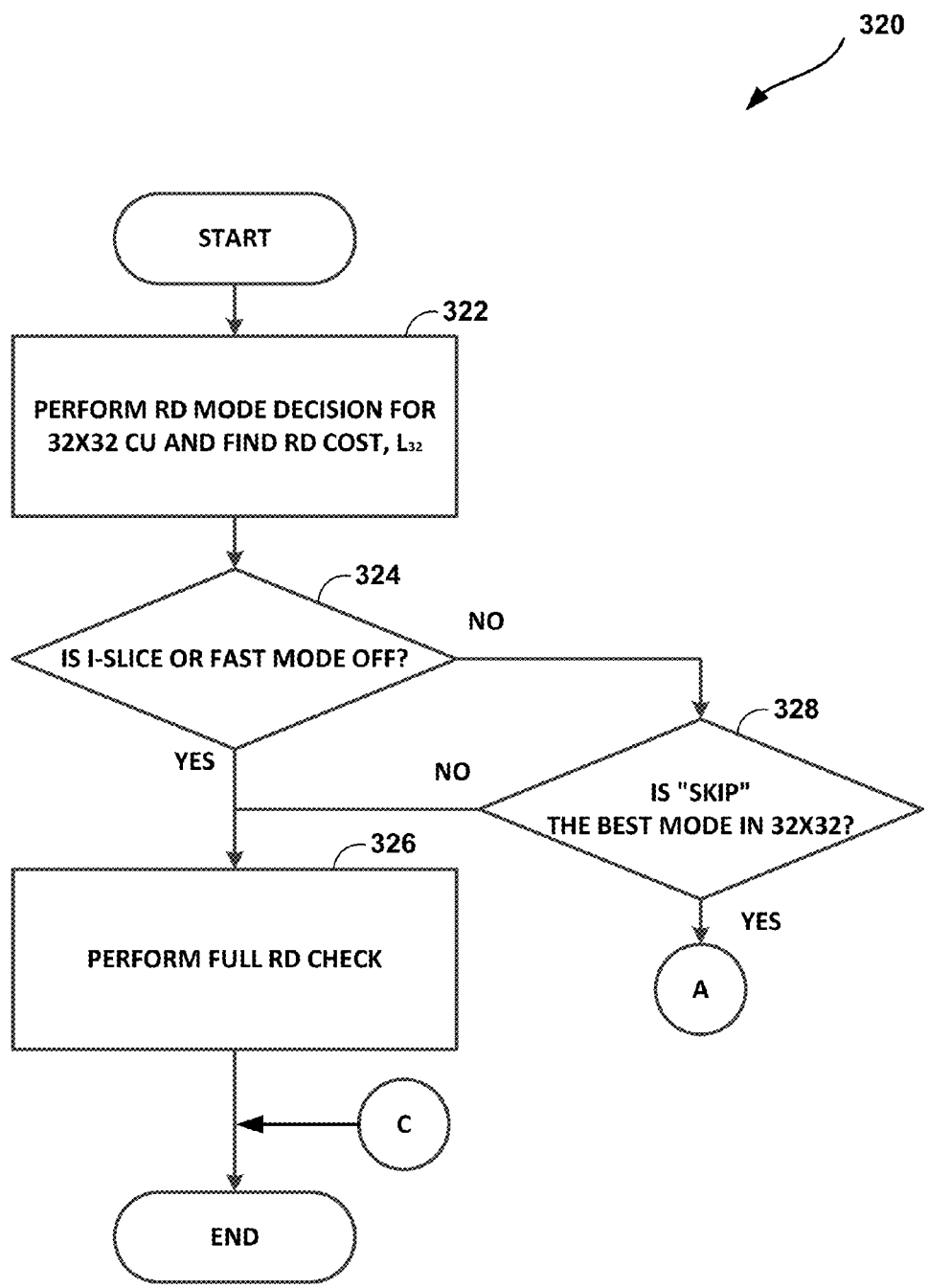
FIGS. 17A-17C are flow diagrams collectively illustrating a flowchart showing an example process that a video encoder may implement to perform fast encoding determinations with block partitioning determinations, in accordance with this disclosure.
Figure 17B:
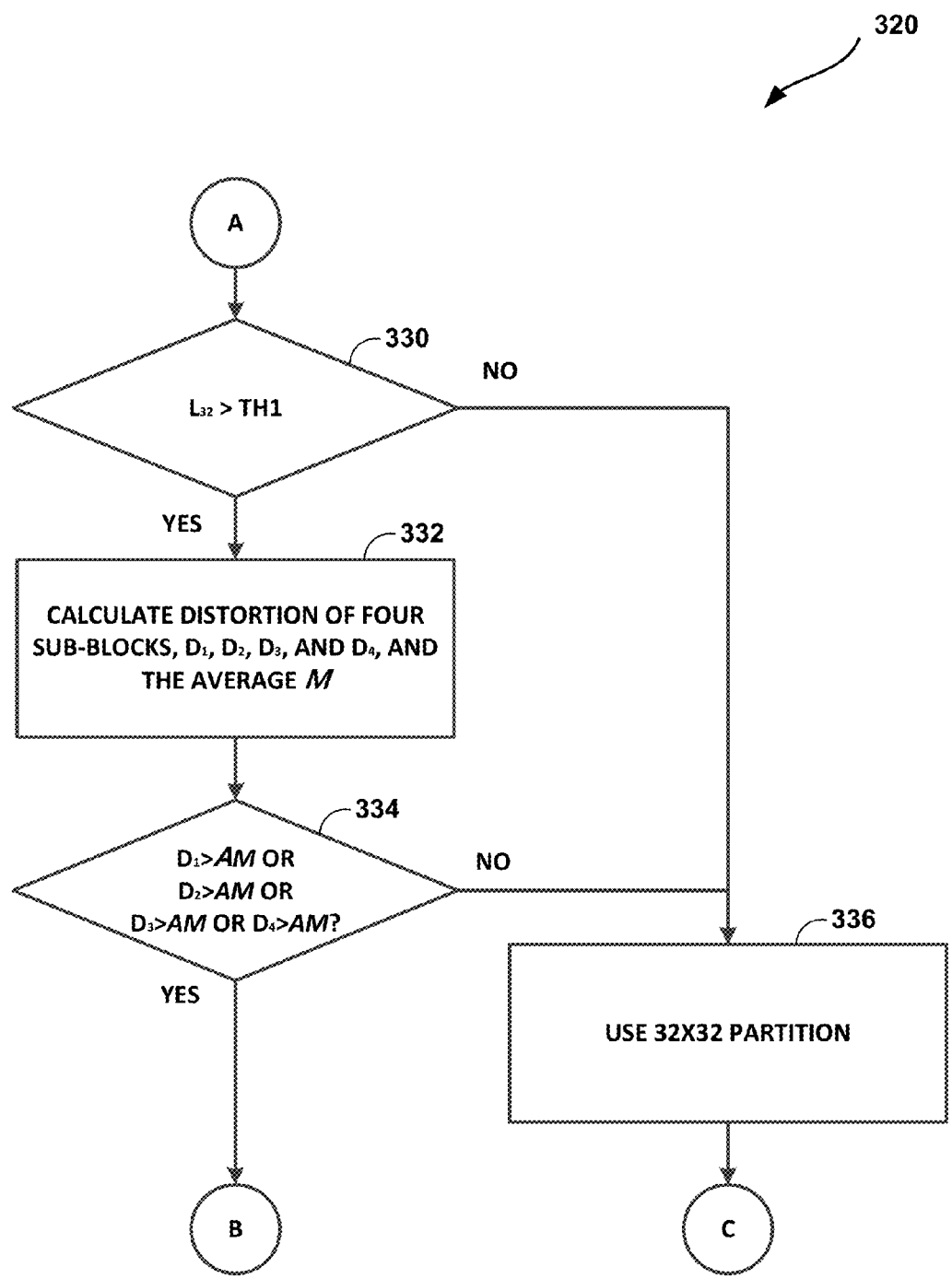
Figure 17C:
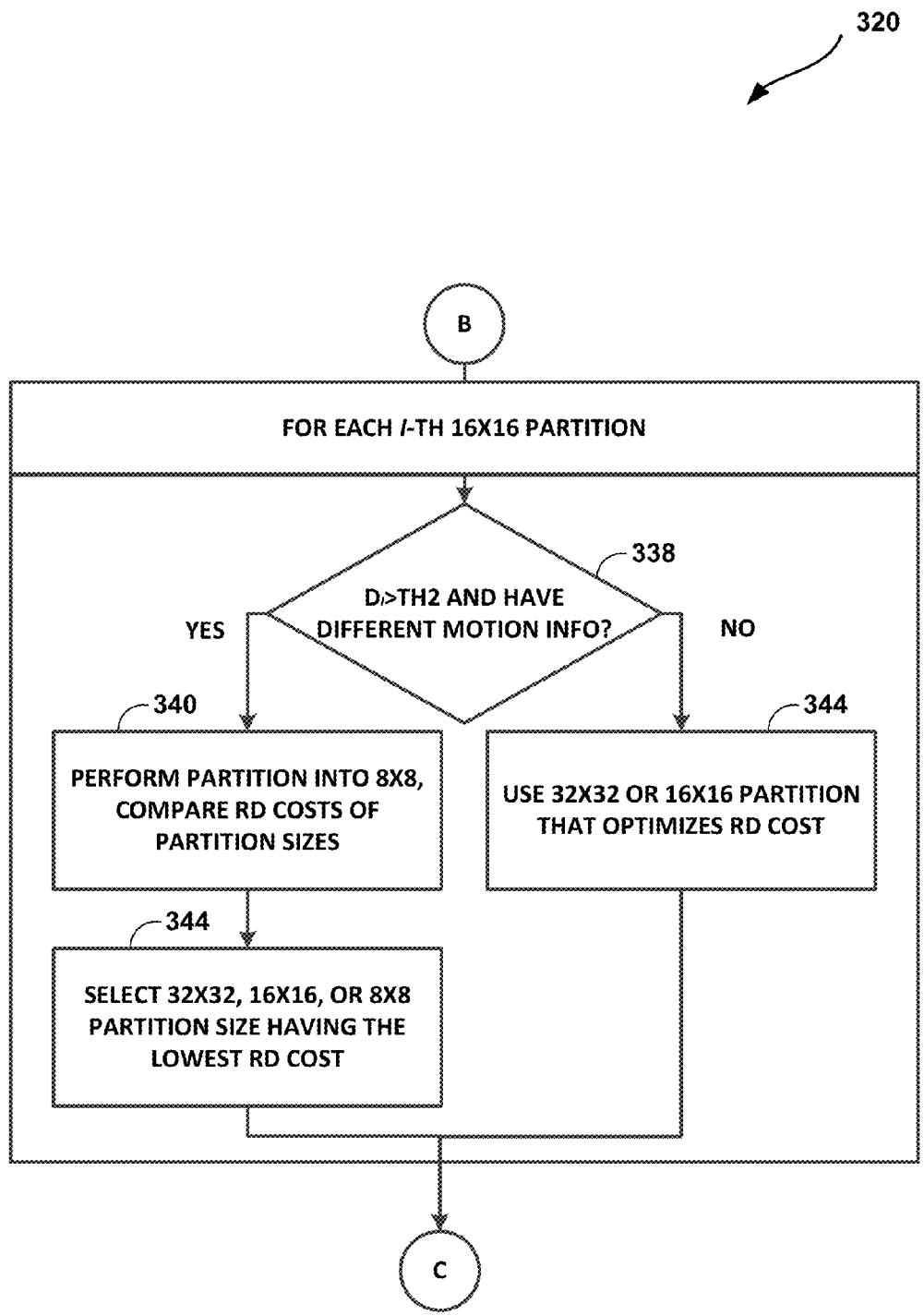

FIGS. 17A-17C are flow diagrams illustrating an example process 320 that video encoder 20 may implement to perform fast encoding determinations (e.g., selecting between a fast RD check or a full RD check) with block partitioning determinations, in accordance with this disclosure. By implementing process 320, video encoder 20 may achieve fast encoding without diminishing visual quality.

As described herein, video encoder 20 determines RD costs to determine various encoding parameters, such as encoding modes, partitioning schemes, and combinations thereof. As will be described in greater detail herein, video encoder 20 may utilize early termination of RD determination to perform faster encoding of video data and with less visual quality degradation relative to other fast video encoding modes. Process 320 as illustrated in FIGS. 17A-17C is an example of such an early termination process.

In process 320, video encoder 20 may perform the RD optimized mode selection for a largest CU to determine the associated RD cost (322). In the example of FIG. 17A, the Cu may have a size of 32×32. Then, based on the selected coding mode and the amount of RD cost in the largest CU, video encoder 20 may determine whether to perform a full RD check or the fast RD check.

Mode select unit 40 may select the full RD check in instances where the current slice is an I-slice or the fast encoding mode feature is disabled (or "turned off") ("Yes" branch of 324) on video encoder 20. Mode select unit 40 may select the full RD check (326) (e.g., a full RD check branch of a decision tree) in cases where the area of the picture is complex (e.g., having a large variation). In instances where the current slice is not an I-slice and the fast encoding mode feature is not disabled (or "turned off") ("No" branch of 324) on video encoder 20, mode select unit 40 may determine whether "skip" is the best mode for the 32×32 block (328). Video encoder 20 may also select the full RD check option in instances where the RD cost of the largest CU is larger than a threshold, or the selected mode for the largest CU is not a SKIP mode ("No" branch of decision block 328). Otherwise, video encoder 20 may select the fast RD option (e.g., the fast RD branch of the decision tree) corresponding to circle A. The fast RD branch is illustrated in FIG. 17B.

In cases where the fast RD branch is selected, which corresponds to FIG. 17B, if the distortion of the largest CU (in this example, the RD of a 32×32 CU, $L_{32}$) is smaller than a threshold ("No" branch of 330), video encoder 20 may select the largest CU and the coding mode that was selected above as the final CU and coding mode, respectively (336). In the example of FIG. 17B, the largest partitioning is a 32×32 partitioning. In turn, video encoder 20 may terminate the CU partitioning process (circle "C", which refers back to the "End" block of FIG. 17A).

However, if the distortion of the largest CU size is not smaller than the threshold ("Yes" branch of decision block 330), video encoder 20 may calculate the distortion of each sub-partition block of the largest CU (332). The distortions of each of the four blocks is denoted as $D_1$, $D_2$, $D_3$, and $D_4$, respectively. The average distortion is denoted as $\mu$.

If the distortion of a certain one of the sub-blocks exceeds a threshold value equal to an average distortion threshold by a certain extent/amount/value, the quantity denoted as $\alpha\mu$ ("Yes" branch of decision block 334), video encoder 20 may determine that the current sub-block has different motion from other blocks of the picture, and proceeds to Circle "B," which is illustrated in greater detail in FIG. 17C. In this case, if video encoder 20 uses the largest CU, a visual artifact can occur. Therefore as described in Circle B corresponding to FIG. 17C, it may be desirable to partition the largest CU in cases where the distortion of the particular sub-block exceeds the threshold by a certain amount. The process of further partitioning the CU is described in greater detail in FIG. 17C. Otherwise, video encoder 20 may select the largest CU and the coding mode that was selected above as the final CU and coding mode, respectively (336).

In FIG. 17C, video encoder 20 may be configured to further partition a CU into sub-CUs. To determine whether to partition a CU into sub-CUs, video encoder 20 may determine whether the Distortion for that partition, $D_i$, is greater than a threshold distortion, and whether the partition has different motion information relative to the other partitions within the CU (338).

If the partitions have different motion information and exceed a second threshold distortion cost, Th2 ("Yes" branch of decision block 338), video encoder 20 may partition the 16×16 partitions into 8×8 partitions (340) and compare the RD costs of the 8×8 partitions with 16×16 partitions and 32×32 partition sizes. Video encoder 20 may select the partitioning which optimizes the RD cost, e.g., produces the lowest RD cost (342). Otherwise, if the partitions do not have different motion information and do not exceed a second threshold distortion cost, Th2 ("No" branch of decision block 338), video encoder 20 may use 32×32 or 16×16 partitioning scheme depending on which partitioning scheme optimizes the RD cost (344).

Thus, in accordance with the techniques of this disclosure, video encoder 20 may be configured to determine a rate distortion (RD) cost associated with encoding a block of the video data, wherein determining the RD cost comprises determining to use a full RD checking scheme or a fast RD checking scheme to determine the RD cost, determine a partitioning scheme for the block based on the determined RD cost, and encode the block using the determined partitioning scheme based on the determined RD cost.

A technique that video encoder 20 may use to evaluate the distortion of each sub-block is to compare the distortion to the average distortion. For instance, video encoder 20 may calculate the distortion of four sub-blocks, and calculate the average distortion of the four values. Video encoder 20 may use one or more of various distortion metrics, such as the mean (sum of) squared error, or the mean (sum of) absolute error. In various examples, video encoder 20 may use only the distortion of a luma component, or distortions of both luma and chroma components. In some examples, video encoder 20 may add luma and chroma distortions using different weighting factors. Additionally, video encoder 20 may set a threshold by scaling the average by a predefined factor. If one or more blocks have a distortion larger than the threshold, video encoder 20 may partition such blocks. Otherwise, video encoder 20 may select the largest CU and the corresponding coding mode as the final CU and coding mode, respectively. In turn, video encoder 20 may terminate the CU partitioning process. The scale factor can control the amount of partitioning that video encoder 20 applies to the block. If the scale factor is small, video encoder 20 may perform a greater amount of partitioning, potentially resulting in better coding efficiency and visual quality (picture quality). However, if the scale factor is large, video encoder 20 may perform a lesser amount of partitioning, potentially resulting in faster encoding speed.

According to another example implementation, video encoder 20 may use a measurement of variation of distortion among sub-blocks. For example, if a variance or standard deviation of distortion of four sub-blocks is large (e.g., in excess of a predetermined threshold), there may be a greater chance that partitioning will be beneficial for encoding of the block. However, the variance or standard deviation tends to become larger as the magnitude of sample values (distortion of four sub-blocks) increases. In some instances, the amount of distortion may vary significantly in a video frame, based on local characteristics. Therefore, instead of the variance or standard deviation, video encoder 20 may use a normalized standard deviation or a coefficient of variation can be used. The normalized standard deviation or coefficient of variation may be defined according to the following formula:

$$c = \sigma/\mu$$

In the formula above, $\mu$ and $\sigma$ denote the mean and standard deviation of distortion of four sub-blocks, respectively. Additionally, video encoder 20 may compare the variation coefficient 'c' of the current CU is compared to a threshold. If c exceeds the threshold, video encoder 20 may partition the current block. On the other hand, if c is less than the threshold, video encoder 20 may select the largest CU and the corresponding coding mode are selected as the final CU and coding mode, and may terminate the CU partitioning process. To reduce the number of operations to calculate c, video encoder 20 may use the mean absolute deviation, instead of $\sigma$ in various examples. Also, to avoid the division operation, video encoder 20 may multiply $\mu$ by the threshold value, and may compare $\sigma$ or the mean absolute deviation to the product of $\mu$ multiplied by the threshold value.

To further reduce encoding time, video encoder 20 may partially perform the RD cost check for each sub-block. For example, video encoder 20 may skip intra coding. In addition, video encoder 20 may check the RD cost of SKIP mode first. If the distortion from the SKIP mode is smaller than a threshold, video encoder 20 may skip checking for the other modes.

The techniques described above with respect to CU partitioning scheme selection and mode selection may enable video encoding device 20 to determine whether to partition the largest CU and select the coding mode of sub-blocks which correspond to the zeroth (e.g., root) and first depths in the quad-tree. Video encode 20 may implement a similar or the same procedure for larger depths with respect to the quad tree partitioning scheme. Alternatively, video encoder 20 may apply a simplified procedure for larger depths. For example, if the distortion of the block in the first depth is larger than a threshold, video encoder 20 may perform further partitioning. Additionally, video encoder 20 may check whether the block at the first depth level shares the same motion information as that of the block at the zeroth depth level. If the block at the first depth level does not share the same motion information as that of the block at the zeroth depth level, video encoder 20 may perform further partitioning.

Figure 18:
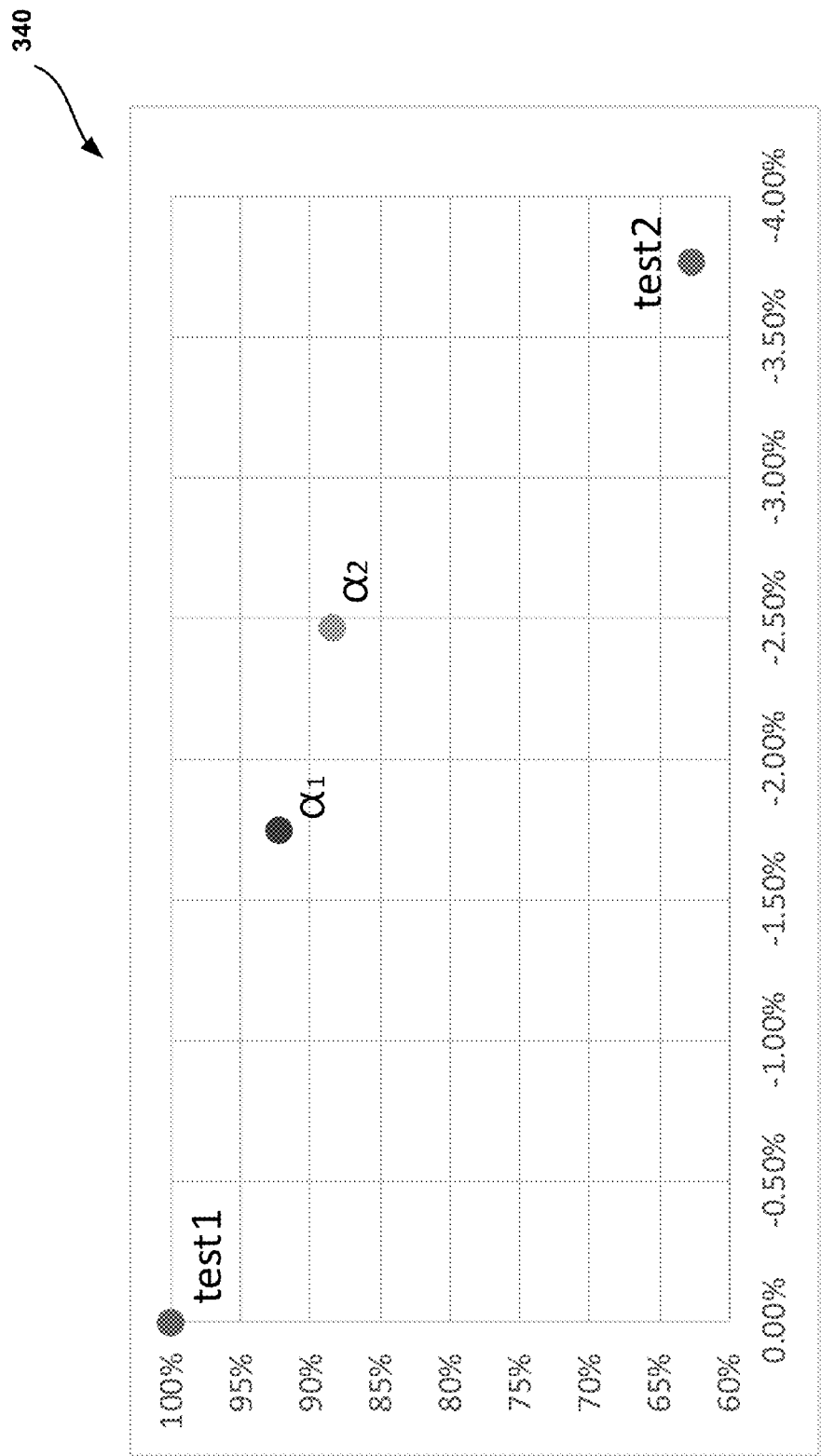
FIG. 18 is a conceptual diagram illustrating a graph that shows an example of the performance of fast encoding with block partitioning determinations in terms of coding gain.

FIG. 18 is a conceptual diagram illustrating a graph that shows an example of the performance of the fast encoding with block partitioning determinations in terms of coding gain. In graph 340 of FIG. 18, the distortion rate is plotted on the x-axis, and encoding speed is plotted on the y-axis. "Test1" is a use case where video encoder 20 always skips partitioning when the SKIP mode is selected for a 32×32 CU, thus providing for a faster encoding speed. Test1 may be used as an anchor or yardstick against which to measure the speed and coding gain of other use case scenarios. "Test2" is a use case in which video encoder 20 performs partitioning without comparing sub-block distortions. As shown in graph 340, Test2 represents a use case with relatively slower coding speed.

Compared to the Test1 and Test2 use cases, the fast encoding determination (e.g. selection between fast RD check and full RD check) and partitioning determination techniques of this disclosure (plotted as α1 and α2) show an improved coding efficiency with 7-12% encoding speed loss. α2 is based on a smaller scale factor than the scale factor on which α1 is based. In addition, α1 and α2 associated with the fast encoding and partitioning techniques of this disclosure result in improved visual quality compared to the Test1 use case shown in FIG. 19.

Figure 19:
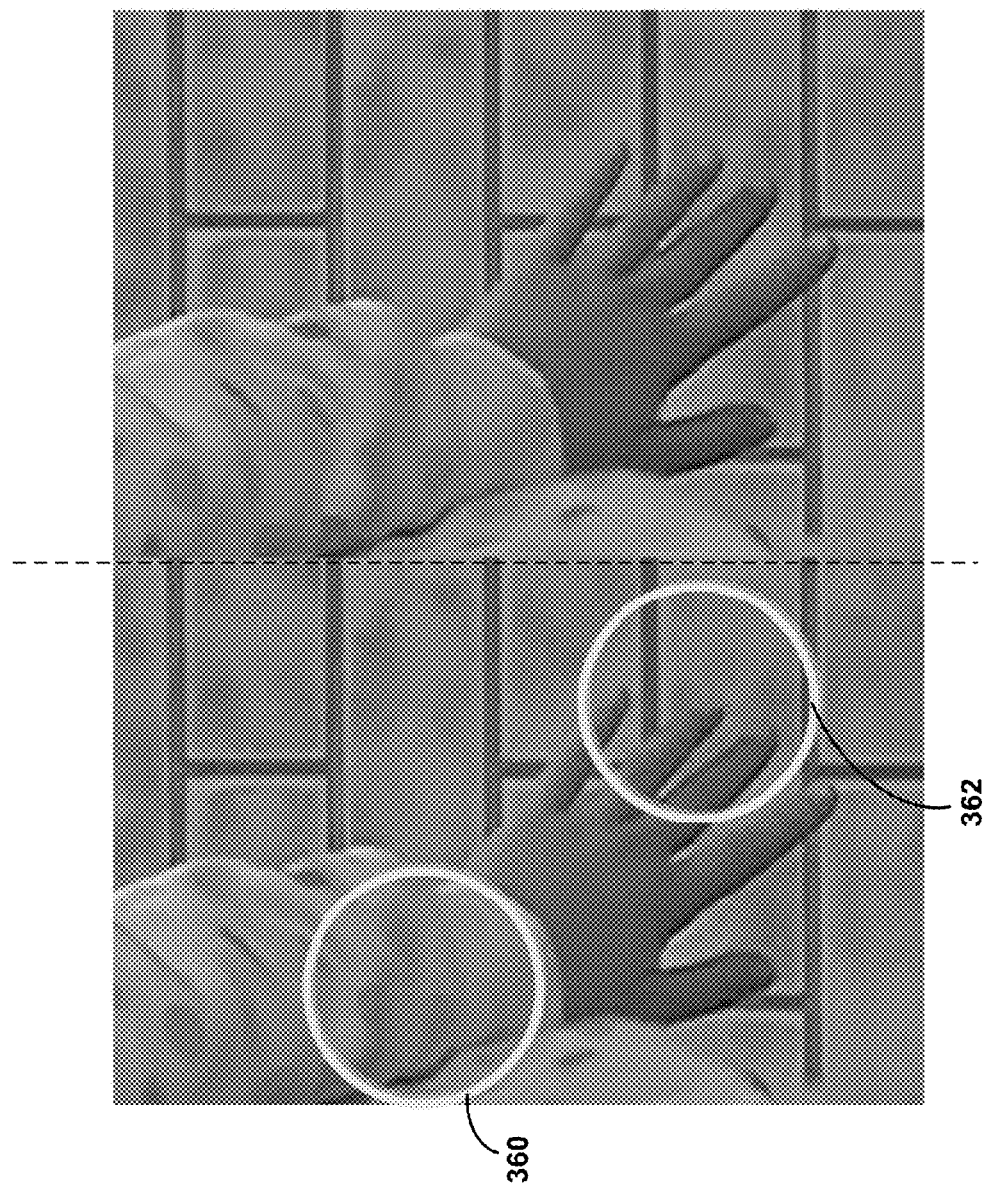
FIG. 19 is a conceptual diagram illustrating a picture quality comparison between an image encoded according to control parameters and an image encoded according to the fast encoding and partitioning determinations of this disclosure.

FIG. 19 is a conceptual diagram illustrating a picture quality comparison between an image encoded according to control parameters and an image encoded according to the fast encoding and partitioning determinations of this disclosure. FIG. 19 illustrates two images side by side, demarcated by a dashed line. In FIG. 19, the image positioned on the left side includes two circles, namely, a left circle 360, and a right circle 362. The image on the left side corresponds to encoding using the parameters (e.g., partition size and encoding speed) of the Test1 use case plotted on graph 340 of FIG. 18. The area in left circle 360 of the left image shows blocking artifacts, and the area in right circle 362 shows an object cut.

The image positioned on the right in FIG. 19 corresponds to encoding according to the fast encoding and partitioning determination techniques of this disclosure. In one specific example, the image on the right of FIG. 19 results from encoding according to the parameters of the α1 use case plotted in graph 340 of FIG. 18. The blocking artifacts and the object cut of the left image are visibly improved (e.g., mitigated or even removed) using the α1 parameters, as shown in the image positioned to the right in FIG. 19. Compared to the image resulting from the Test2 use case, the visual quality is similar/comparable, but the encoding speed is significantly faster. In this manner, video encoder 20 may implement the partitioning and encoding speed determinations of this disclosure to improve both encoding speed and visual quality (e.g., by reducing RD).

In this manner video encoder 20 may, according to examples of this disclosure, represent a device configured to determine a rate distortion (RD) cost associated with encoding a block of the video data, wherein determining the RD cost comprises determining to use a full RD checking scheme or a fast RD checking scheme to determine the RD cost, determine a partitioning scheme for the block based on the determined RD cost, and encode the block using the determined partitioning scheme based on the determined RD cost.

Figure 20:
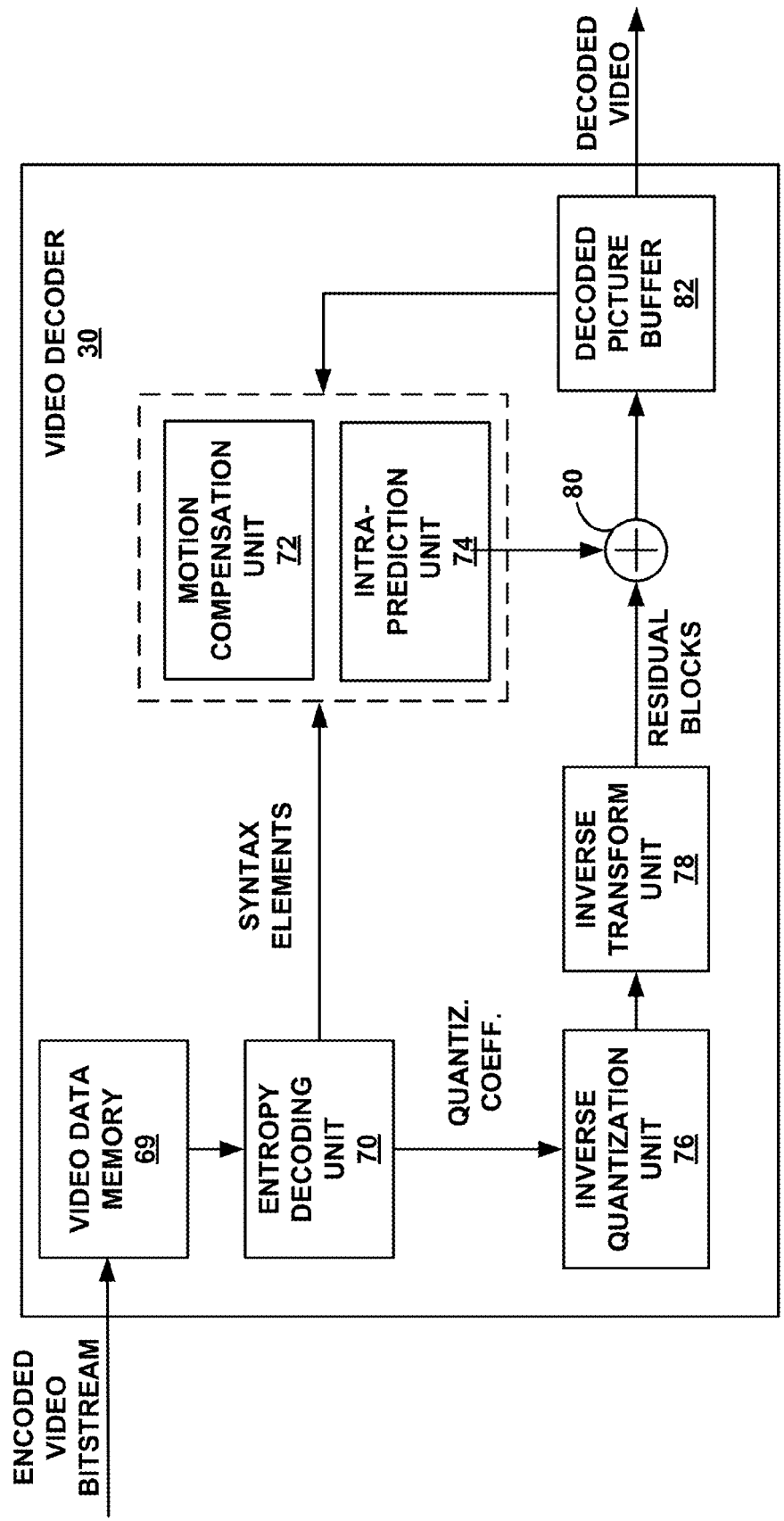
FIG. 20 is a block diagram illustrating an example of a video decoder that may perform techniques in accordance with one or more aspects of this disclosure.

FIG. 20 is a block diagram illustrating an example of a video decoder that may perform techniques in accordance with one or more aspects of this disclosure. In the example of FIG. 20, video decoder 30 includes a video data memory 69, an entropy decoding unit 70, motion compensation unit 72, intra-prediction unit 74, inverse quantization unit 76, inverse transformation unit 78, decoded picture buffer 82 and summer 80. In some examples, video decoder 30 may perform a decoding pass generally reciprocal to the encoding pass described with respect to video encoder 20 (FIG. 8).

Video data memory 69 may store video data, such as an encoded video bitstream, to be decoded by the components of video decoder 30. The video data stored in video data memory 69 may be obtained, for example, from communications channel 16, e.g., from a local video source, such as a camera, via wired or wireless network communication of video data, or by accessing physical data storage media. Video data memory 69 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 69 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and decoded picture buffer 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements and/or syntax data from video encoder 20. Entropy decoding unit 70 of video decoder 30 entropy decodes the bitstream to generate quantized coefficients, motion vectors or intra-prediction mode indicators, and other syntax elements. Entropy decoding unit 70 may forward the motion vectors to and other syntax elements to motion compensation unit 72.

Entropy decoding unit 70 may decode and parse additional syntax elements in various parameter sets. Such parameter sets may include a PPS, which may include syntax elements that are common to one or more pictures, an SPS, which may include syntax elements that are common to one or more sequences of pictures.

Video decoder 30 may construct reference picture lists, List 0 and List 1, (e.g., using default construction techniques) based on reference pictures stored in decoded picture buffer 82. When the video slice is coded as an intra-coded (I) slice, intra-prediction unit 74 may generate prediction data for a video block of a current video slice. Intra-prediction unit 74 may generate the prediction data based on a signaled intra prediction mode and data from previously decoded blocks of the current frame or picture. When video decoder 30 codes slices of the video frame as an inter-coded (i.e., B or P) slice, motion compensation unit 72 may produce predictive blocks for a video block of the current video slice based on the motion vectors and other syntax elements received from entropy decoding unit 70. Motion compensation unit 72 may produce the predictive blocks from one of the reference pictures within one of the reference picture lists.

Motion compensation unit 72 may use motion vectors and/or syntax elements to determine prediction information for a video block of the current video slice. In some examples, motion compensation unit 72 may generate prediction information based on motion vectors received from entropy decoding unit 70. Motion compensation unit 72 may use the prediction information to produce the predictive blocks for the current video block being decoded. For example, motion compensation unit 72 uses some of the received syntax elements to determine a prediction mode (e.g., intra- or inter-prediction) used to code the video blocks of the current video slice, an inter-prediction slice type (e.g., B slice or P slice slice), construction information for one or more of the reference picture lists for the slice, motion vectors for each inter-encoded video block of the current video slice, inter-prediction status for each inter-coded video block of the slice, and other information to decode the video blocks in the current video slice.

When a motion vector of a PU has sub-pixel accuracy, motion compensation unit 72 may apply one or more interpolation filters to samples of a reference picture to generate a predictive block for the PU. In other words, motion compensation unit 72 may also perform interpolation based on interpolation filters. Motion compensation unit 72 may calculate interpolated values for sub-integer pixels of reference blocks using the same interpolation filters video encoder 20 used during encoding of the video blocks. Thus, in some examples, motion compensation unit 72 may determine the interpolation filters used by video encoder 20 from the received syntax elements and may use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ to determine a degree of quantization and, likewise, a degree of inverse quantization that should be applied. Video decoder 30 may calculate the quantization parameter $QP_Y$ for each video block in the video slice.

Inverse transform unit 78 may receive dequantized transform coefficient blocks. If transform is skipped for the current block, inverse transform unit 78 may receive dequantized residual blocks. Inverse transform unit 78 may transform the received blocks using an inverse transform. In some examples, the inverse transform (e.g., an inverse DCT, an inverse integer transform, or a conceptually similar inverse transform process) to the transform coefficients in order to produce residual blocks (e.g., transform blocks) in the pixel domain. Inverse transform unit 78 may output a signal, referred to as a "reconstructed residual signal."

Furthermore, inverse transform unit 78 may apply an inverse ACT transform or an inverse CCP transform to the residual data. Furthermore, in accordance with one or more techniques of this disclosure, inverse transform unit 78 may apply clipping operations to residual data to reduce bit depths of residual data resulting from the transform-to-sample domain transform, the inverse ACT transform, and/or the inverse CCP transform.

Video decoder 30 may also determine that the current block is intra-predicted based on syntax elements or other information. If the current video block is intra-predicted, intra-prediction unit 74 may decode the current block. Intra-prediction unit 74 may determine a neighboring predictive block from the same picture as the current block. Intra-prediction unit 74 may generate a transform coefficient block and/or a residual block based on the predictive block.

After motion compensation unit 72 or intra-prediction unit 74 generates a transform coefficient block and/or residual block for a current video block based on the motion vectors and other syntax elements, video decoder 30 forms a decoded video block by combining the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. Decoded picture buffer 82 stores the decoded video blocks in a given frame or picture, which video decoder 30 may use for subsequent motion compensation. Decoded picture buffer 82 may also store decoded video for later presentation on a display device, such as display device 32 of FIG. 1.

Motion compensation unit 72 and/or intra-prediction unit 74 may determine the block of chroma residual samples based on the luma residual block, a scale factor, and predicted chroma residual samples. With the block of chroma residual samples, summer 80 may sum the chroma residual samples and the luma residual samples with respective chroma samples and luma samples of the predictive block to decode the current block (e.g., reconstruct the current block). Once video decoder 30 generates reconstructed video, video decoder 30 may output the reconstructed video blocks as decoded video (e.g., for display or storage) in some examples.

As described above, during inter-prediction, motion compensation unit 72 may determine one or more reference pictures that video decoder 30 may use to form the predictive video blocks for the current block being decoded. Motion compensation unit 72 may determine whether reference pictures are long term reference pictures or short-term reference pictures based on syntax elements of the coded video bitstream, which indicate whether a reference picture is marked for long term reference or short-term reference. Motion compensation unit 72 may store the reference pictures in decoded picture buffer 82 until the reference pictures are marked as unused for reference.

Figure 21:
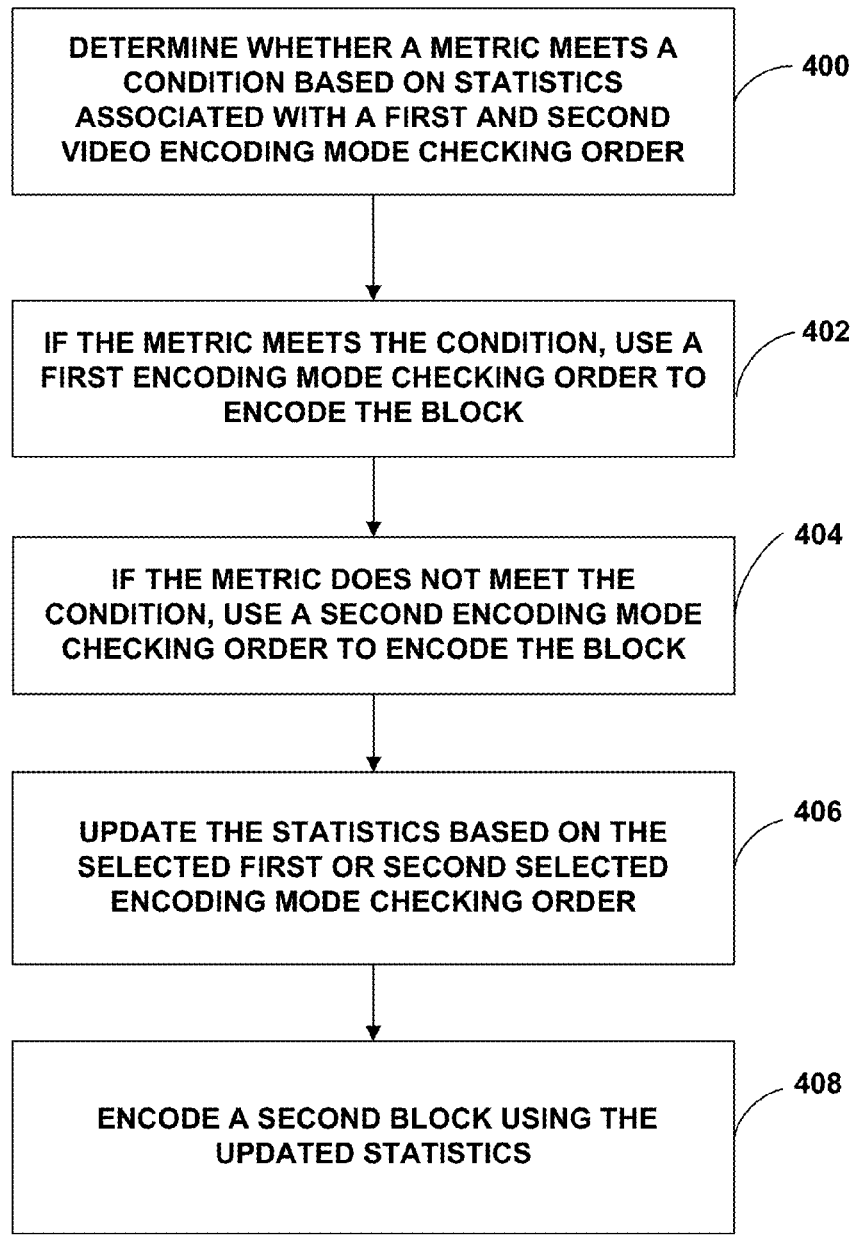
FIG. 21 is a flowchart illustrating a process for adaptively determining a mode checking order in accordance with the techniques of this disclosure.

FIG. 21 is a flowchart illustrating a process for adaptively determining a mode checking order in accordance with the techniques of this disclosure. It should be understood that the techniques of FIG. 21 may be performed by a video encoder as described in this disclosure, for example video encoder 20. In the process of FIG. 21, video encoder 20 may be configured to determine whether a metric meets a condition (400). Video encoder 20 may determine whether the metric meets the condition based on statistics, wherein the statistics are associated with a first video encoding mode checking order and a second video encoding mode checking order.

Responsive to determining that the metric meets the condition, video encoder 20 may select a first encoding mode checking order to encode the first block of video data (402). Responsive to determining that the condition is not met, video encoder 20 may select a second encoding mode checking order different from the first encoding mode checking order to encode the first block of video data (404). Mode select unit 40 may update the statistics based on the selected first or second encoding mode checking order (406). Examples of the statistics may include a frequency that a particular encoding mode checking order is selected, average RD costs associated with mode checking orders, or combinations thereof. Mode select unit 40 and entropy encoding unit 56 may encode a second block of video data, based on the updated statistics, and using the first or second mode checking order (408).

In some examples, statistics comprise statistics determined from previously encoded blocks of the video data. The first video encoding mode checking order comprises a first prediction unit mode checking order, wherein the second video encoding mode checking order comprises a second prediction unit mode checking order, and wherein the first video prediction unit mode checking order is different from the second prediction unit mode checking order.

In some examples, the first prediction unit mode checking order may comprise: determining, by mode select unit 40, a rate-distortion (RD) cost of using skip mode to encode the first block before determining an RD cost of using advanced motion vector prediction to (AMVP) encode the first block. The second prediction unit mode checking order may comprise determining the RD cost of using AMVP to encode the first block before conditionally determining, by mode select unit 40, the RD cost of using skip mode to encode the first block.

In some examples, the condition comprises a temporal layer of pictures, wherein the temporal layer is associated with first the block of video data. The first encoding mode checking order may comprises a first prediction unit (PU) partition size checking order. The second video encoding mode checking order comprises a second PU partition size checking order, and the first PU partition size checking order is different from the second PU partition size checking order.

In some examples, the first PU partition size checking order comprises: determining, by mode select unit 40, a rate-distortion (RD) cost of using a 2N×N PU size to encode the first block before conditionally determining an RD cost of using an N×2N PU size to encode the first block, wherein N is an integer number of samples. The second PU partition size checking order comprises: determining, by mode select unit 40, the RD cost of using the N×2N PU size to encode the first block before conditionally determining the RD cost of using the 2N×N PU size to encode the first block.

In some examples, the condition comprises a concentration of prediction error within the first block. The first encoding mode checking order may comprise a first transform unit (TU) partition size checking order, wherein the second video encoding mode checking order comprises a second TU partition size checking order, and wherein the first TU partition size checking order is different from the second TU partition size checking order.

The first TU partition size checking order may comprise: determining, by mode select unit 40, a rate-distortion (RD) cost of using an 8×8 TU size to encode the first block before conditionally determining an RD cost of using an 4×4 TU size to encode the first block, wherein N is an integer number of samples. The second TU partition size checking order may comprise: determining the RD cost of using the 4×4 TU size to encode the first block before conditionally determining the RD cost of using the 8×8 TU size to encode the first block.

In some examples, where the condition comprises a concentration of prediction error within the first block, the first encoding mode checking order may comprise a first coding unit (CU) partition size checking order, and the second video encoding mode checking order may comprise a second CU partition size checking order, and the first CU partition size checking order may be different from the second CU partition size checking order.

In various examples, the CU partition size checking order may comprise: determining a rate-distortion (RD) cost of using a 2N×2N CU size to encode the first block before conditionally determining an RD cost of using an N×N CU size to encode the first block, wherein N is an integer number of samples, and the second CU partition size checking order may comprise: determining the RD cost of using the N×N CU size to encode the first block before conditionally determining the RD cost of using the 2N×2N CU size to encode the first block. In various examples, the condition may be based on one or more threshold values.

Figure 22:
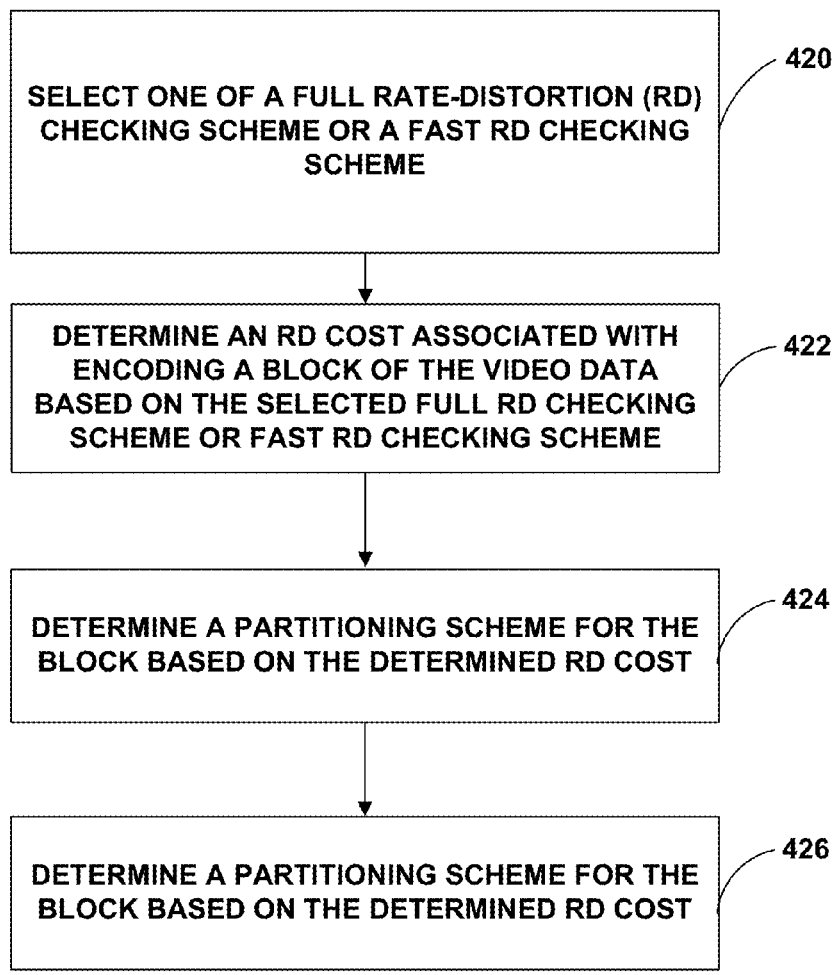
FIG. 22 is a flowchart illustrating a process for determining a partitioning scheme for a block based on a rate-distortion cost in accordance with the techniques of this disclosure.

FIG. 22 is a flowchart illustrating a process for determining a partitioning scheme for a block based on a rate-distortion cost in accordance with the techniques of this disclosure. In the example of FIG. 22, partition unit 48 may select one of a full RD checking scheme or a fast RD checking scheme (420). Partition unit 48 may then determine an RD cost associated with encoding a block of the video data based on the selected full RD checking scheme or fast RD checking scheme (422). Partitioning unit 48 may then determine a partitioning scheme for the block based on the determined RD cost (424), and encode the block using the determined partitioning scheme based on the determined RD cost (426).

In some examples, selecting the full RD checking scheme or the fast RD checking scheme may be based on a complexity of the block. To select full RD checking scheme or the fast RD checking scheme, mode select unit 40 may select the full RD checking scheme if the complexity of the block exceeds a threshold value. To select the full RD checking scheme or the fast RD checking scheme, mode select unit 40 may select the fast RD checking scheme if the complexity of the block is within a threshold value.

In some examples responsive to selecting the fast RD checking scheme, mode select unit 40 may determine a distortion value associated with a largest partition size for the block, and responsive to determining that the distortion values associated with the largest partition size for the block exceeds threshold distortion value, mode select unit 40 may determine whether to partition the block into sub-partitions.

To determine whether to partition the block into sub-partitions, mode select unit 40 may be further configured to compare distortion values associated with each of the sub-partitions against a second distortion threshold value, and responsive to determining that at least one of the sub-partitions has a distortion value greater than the second distortion threshold value, partition the block into the sub-partitions. The second threshold distortion value may be based on a scaled average of the distortion values associated with each of the sub-partitions in some examples and/or based on a variation of the distortion values associated with each of the sub-partitions.

To determine whether to partition the block into sub-partitions, mode select unit 40 may be further configured to determine whether one of the sub-partitions is associated with different motion information relative to at least one of the other of the sub-partitions, and responsive to determining that one the sub-partitions is associated with different motion information relative to at least one of the other of the sub-partitions, mode select unit 40 may be further configured to partition the one of the sub-partitions into additional sub-partitions.

Mode select unit 40 may select the full RD check if a current slice that includes the block of video data is an i-slice. In some examples, mode select unit 40 may select the full RD check or the fast RD check based on whether a fast encoding mode of a video encoder is enabled.

In some examples, selecting the full RD check comprises selecting the full RD check when the block is coded using SKIP mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any con is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
   determining, by a video encoder, whether a first condition is satisfied, the determination being based on statistics;
   performing, by the video encoder, a selection of an encoding mode checking order for a block of the video data, wherein the video encoder selects the encoding mode checking order for the block from among a first order and a second order, wherein the selection of the encoding mode checking order for the block is dependent on whether the first condition is satisfied, wherein the first order and the second order are different orders for checking a plurality of video encoding modes, wherein the plurality of video encoding modes includes a first encoding mode and a second encoding mode, the first encoding mode preceding the second encoding mode in the first order, the second encoding mode preceding the first encoding mode in the second order;
   performing, by the video encoder, a checking process that selects an encoding mode, wherein the checking process checks one or more encoding modes of the plurality of encoding modes based on the selected encoding mode checking order, where performing the checking process comprises checking at least one encoding mode of the plurality of video encoding modes and conditionally skipping a check of one or more other encoding modes of the plurality of video encoding modes based on a second condition being satisfied;
   encoding, by the video encoder, the block, wherein the video encoder uses the selected encoding mode checking order for the block when encoding the block; and
   updating, by the video encoder, the statistics based on the selection of the encoding mode checking order.

2. The method of claim 1, wherein the statistics comprise statistics determined from previously encoded blocks of the video data.

3. The method of claim 1,
   wherein the first encoding mode comprises a first prediction mode and the second encoding mode comprises a second prediction mode.

4. The method of claim 3, wherein:
   the first prediction mode is an advanced motion vector prediction (AMVP) mode,
   the second prediction mode is a SKIP mode, and
   the first order comprises:
      determining a rate-distortion (RD) cost of using the SKIP mode to encode the first block before determining an RD cost of using the AMVP mode to encode the block, and the second order comprises:
      determining the RD cost of using the AMVP mode to encode the block before conditionally determining the RD cost of using the SKIP mode to encode the block.

5. The method of claim 3, wherein the first condition comprises whether the block is within a picture within a temporal layer of pictures.

6. The method of claim 1,
wherein the first order comprises a first prediction unit (PU) partition size checking order,
wherein the second order comprises a second PU partition size checking order, and
wherein the first PU partition size checking order is different from the second PU partition size checking order.

7. The method of claim 6, wherein:
the first PU partition size checking order comprises:
determining a rate-distortion (RD) cost of using a 2N×N PU size to encode the block before conditionally determining an RD cost of using an N×2N PU size to encode the block, wherein N is an integer number of samples, and
the second PU partition size checking order comprises:
determining the RD cost of using the N×2N PU size to encode the block before conditionally determining the RD cost of using the 2N×N PU size to encode the block.

8. The method of claim 6, wherein the first condition comprises a concentration of prediction error within the block.

9. The method of claim 1,
wherein the first order comprises a first transform unit (TU) partition size checking order,
wherein the second order comprises a second TU partition size checking order, and
wherein the first TU partition size checking order is different from the second TU partition size checking order.

10. The method of claim 9, wherein:
the first TU partition size checking order comprises:
determining a rate-distortion (RD) cost of using an 8×8 TU size to encode the block before conditionally determining an RD cost of using a 4×4 TU size to encode the block, and
the second TU partition size checking order comprises:
determining the RD cost of using the 4×4 TU size to encode the block before conditionally determining the RD cost of using the 8×8 TU size to encode the block.

11. The method of claim 9, wherein the first condition comprises a concentration of prediction error within the block.

12. The method of claim 1,
wherein the first order comprises a first coding unit (CU) partition size checking order,
wherein the second order comprises a second CU partition size checking order, and
wherein the first CU partition size checking order is different from the second CU partition size checking order.

13. The method of claim 12, wherein:
the CU partition size checking order comprises:
determining a rate-distortion (RD) cost of using a 2N×2N CU size to encode the block before conditionally determining an RD cost of using an N×N CU size to encode the block, wherein N is an integer number of samples, and
the second CU partition size checking order comprises:
determining the RD cost of using the N×N CU size to encode the block before conditionally determining the RD cost of using the 2N×2N CU size to encode the block.

14. The method of claim 1, wherein the first condition is based on one or more threshold values.

15. A video encoding device comprising:
a memory configured to store video data; and
at least one processor configured to:
determine whether a first condition is satisfied, the determination being based on statistics;
perform a selection of an encoding mode checking order for a block of the video data, wherein the selection of the encoding mode checking order for the block is from among a first order and a second order, wherein the selection of the encoding mode checking order for the block is dependent on whether the first condition is satisfied, wherein the first order and the second order are different orders for checking a plurality of video encoding modes, wherein the plurality of video encoding modes includes a first encoding mode and a second encoding mode, the first encoding mode preceding the second encoding mode in the first order, the second encoding mode preceding the first encoding mode in the second order;
perform a checking process that selects an encoding mode, wherein the checking process checks one or more encoding modes of the plurality of encoding modes based on the selected encoding mode checking order, where performing the checking process comprises checking at least one encoding mode of the plurality of video encoding modes and conditionally skipping a check of one or more other encoding modes of the plurality of video encoding modes based on a second condition being satisfied;
encode the block using the selected encoding mode checking order for the block when encoding the block; and
update the statistics based on the selection of the encoding mode checking order.

16. The device of claim 15, wherein the statistics comprise statistics determined from previously encoded blocks of the video data.

17. The device of claim 15, wherein the first video encoding mode checking order comprises a first prediction unit mode checking order,
wherein the first encoding mode comprises a first prediction mode and the second encoding mode comprises a second prediction mode.

18. The device of claim 17, wherein:
the first prediction mode is an advanced motion vector prediction (AMVP) mode,
the second prediction mode is a SKIP mode, and
to perform the first order, the at least one processor is configured to:
determine a rate-distortion (RD) cost of using the SKIP mode to encode the block before determining an RD cost of using the AMVP mode to encode the block, and
to perform the second order, the at least one processor is configured to:
determine the RD cost of using AMVP to encode the block before conditionally determining the RD cost of using the SKIP mode to encode the block.

19. The device of claim 17, wherein the first condition comprises whether the block is within a picture within a temporal layer of pictures.

20. The device of claim 15,
wherein the first order comprises a first prediction unit (PU) partition size checking order,
wherein the second order comprises a second PU partition size checking order, and wherein the first PU partition size checking order is different from the second PU partition size checking order.

21. The device of claim 20, wherein:
to perform the first PU partition size checking order, the at least one processor is configured to:
determine a rate-distortion (RD) cost of using a 2N×N PU size to encode the block before conditionally determining an RD cost of using an N×2N PU size to encode the block, wherein N is an integer number of samples, and
to perform the second PU partition size checking order, the at least one processor is configured to:
determine the RD cost of using the N×2N PU size to encode the block before conditionally determining the RD cost of using the 2N×N PU size to encode the block.

22. The device of claim 15,
wherein the first order comprises a first transform unit (TU) partition size checking order,
wherein the second order comprises a second TU partition size checking order, and
wherein the first TU partition size checking order is different from the second TU partition size checking order.

23. The device of claim 22, wherein:
to perform the first TU partition size checking order, the at least one processor is configured to:
determine a rate-distortion (RD) cost of using an 8×8 TU size to encode the block before conditionally determining an RD cost of using an 4×4 TU size to encode the block, and
to perform the second TU partition size checking order, the at least one processor is configured to:
determine the RD cost of using the 4×4 TU size to encode the block before conditionally determining the RD cost of using the 8×8 TU size to encode the block.

24. The device of claim 15,
wherein the first order comprises a first coding unit (CU) partition size checking order,
wherein the second order comprises a second CU partition size checking order, and
wherein the first CU partition size checking order is different from the second CU partition size checking order.

25. The device of claim 24, wherein the first CU partition size checking order causes the at least one processor to:
determine a rate-distortion (RD) cost of using a 2N×2N CU size to encode the block before conditionally determining an RD cost of using an N×N CU size to encode the block, wherein N is an integer number of samples, and
the second CU partition size checking order causes the at least one processor to:
determine the RD cost of using the N×N CU size to encode the block before conditionally determining the RD cost of using the 2N×2N CU size to encode the block.

26. An apparatus for encoding video data, the apparatus comprising:
means for determining whether a first condition is satisfied, the determination being based on statistics;
means for performing a selection of an encoding mode checking order for a block of the video data, wherein the encoding mode checking order for the block is from among a first order and a second order, wherein the selection of the encoding mode checking order for the block is dependent on whether the first condition is satisfied, wherein the first order and the second order are different orders for checking a plurality of video encoding modes, wherein the plurality of video encoding modes includes a first encoding mode and a second encoding mode, the first encoding mode preceding the second encoding mode in the first order, the second encoding mode preceding the first encoding mode in the second order;
means for performing a checking process that selects an encoding mode, wherein the checking process checks one or more encoding modes of the plurality of encoding modes based on the selected encoding mode checking order, where performing the checking process comprises checking at least one encoding mode of the plurality of video encoding modes and conditionally skipping a check of one or more other encoding modes of the plurality of video encoding modes based on a second condition being satisfied;
means for encoding the block using the selected encoding mode checking order for the block when encoding the block; and
means for updating the statistics based on the selection of the encoding mode checking order.

27. The apparatus of claim 26, wherein the statistics comprise statistics determined from previously encoded blocks of the video data.

28. The apparatus of claim 26,
wherein the first encoding mode comprises a first prediction mode and the second encoding mode comprises a second prediction mode.

29. The apparatus of claim 26,
wherein the first order comprises a first prediction unit (PU) partition size checking order,
wherein the second order comprises a second PU partition size checking order, and
wherein the first PU partition size checking order is different from the second PU partition size checking order.

30. A non-transitory computer-readable storage medium that includes instructions stored thereon that, when executed, cause at least one processor of a video encoding device to:
determine whether a first condition is satisfied, the determination being based on statistics;
perform a selection of an encoding mode checking order for a block of the video data, wherein the selection of the encoding mode checking order for the block is from among a first order and a second order, wherein the selection of the encoding mode checking order for the block is dependent on whether the first condition is satisfied, wherein the first order and the second order are different orders for checking a plurality of video encoding modes, wherein the plurality of video encoding modes includes a first encoding mode and a second encoding mode, the first encoding mode preceding the second encoding mode in the first order, the second encoding mode preceding the first encoding mode in the second order;
perform a checking process that selects an encoding mode, wherein the checking process checks one or more encoding modes of the plurality of encoding modes based on the selected encoding mode checking order, where performing the checking process comprises checking at least one encoding mode of the plurality of video encoding modes and conditionally skipping a check of one or more other encoding modes of the plurality of video encoding modes based on a second condition being satisfied;

encode the block using the selected encoding mode checking order for the block when encoding the block; and update the statistics based on the selection of the encoding mode checking order.

31. The method of claim 1, wherein the block is a first block, the method further comprising:

performing, by the video encoder, a selection of a second encoding mode checking order for a second block of the video data, wherein the video encoder selects the second encoding mode checking order for the second block from among the first order and the second order, wherein the selection of the second encoding mode checking order for the second block is dependent on whether the first condition is satisfied based on the updated statistics; and encoding, by the video encoder, the second block, wherein the video encoder uses the selected second encoding mode checking order for the second block when encoding the second block.

32. The device of claim 15, wherein the block is a first block and wherein the at least one processor is configured to:

perform a selection of a second encoding mode checking order for a second block of the video data, wherein the selection of the second encoding mode checking order for the second block from among the first order and the second order, wherein the selection of the second encoding mode checking order for the second block is dependent on whether the first condition is satisfied based on the updated statistics; and encode the second block using the selected second encoding mode checking order for the second block when encoding the second block.

* * * * *